(12) United States Patent
Wang et al.

(10) Patent No.: US 11,843,806 B2
(45) Date of Patent: Dec. 12, 2023

(54) ENCODER, A DECODER AND CORRESPONDING METHODS OF DEBLOCKING FILTER ADAPTATION

(71) Applicant: HUAWEI TECHNOLOGIES CO., LTD., Guangdong (CN)

(72) Inventors: Biao Wang, Munich (DE); Anand Meher Kotra, Munich (DE); Han Gao, Munich (DE); Yin Zhao, Hangzhou (CN); Semih Esenlik, Munich (DE); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 46 days.

(21) Appl. No.: 17/383,639

(22) Filed: Jul. 23, 2021

(65) Prior Publication Data

US 2022/0014793 A1  Jan. 13, 2022

Related U.S. Application Data

(63) Continuation of application No. PCT/CN2020/074033, filed on Jan. 23, 2020.

(Continued)

(51) Int. Cl.
*H04N 19/86* (2014.01)
*H04N 19/117* (2014.01)
(Continued)

(52) U.S. Cl.
CPC .......... *H04N 19/86* (2014.11); *H04N 19/117* (2014.11); *H04N 19/176* (2014.11); *H04N 19/503* (2014.11); *H04N 19/61* (2014.11)

(58) Field of Classification Search
CPC .. H04N 19/117; H04N 19/119; H04N 19/159; H04N 19/176; H04N 19/18;
(Continued)

(56) References Cited

U.S. PATENT DOCUMENTS

2008/0043853 A1   2/2008  Kawa
2011/0116545 A1*  5/2011  Zan ............... H04N 19/463
                                        375/E7.193
(Continued)

FOREIGN PATENT DOCUMENTS

CN   101170701 A   4/2008
CN   101472173 A   7/2009

OTHER PUBLICATIONS

Yin Zhao et al.,"CE6: Sub-block transform for inter blocks (CE6.1.2)",oint Video Experts Team (JVET) of ITU-T SG 16 WP 3 and ISO/IEC JTC 1/SC 29/WG 11,12th Meeting: Macao, CN, Oct. 3 12, 2018,Document: JVET-L0358-v1v2, total:9pages.

(Continued)

*Primary Examiner* — Jessica M Prince
(74) *Attorney, Agent, or Firm* — HUAWEI TECHNOLOGIES CO., LTD.

(57) ABSTRACT

A deblocking method, for deblocking a transform block boundary within a coding block in an image encoding and/or an image decoding is provided, wherein the coding block comprising transform blocks is coded in inter prediction mode and the transform blocks comprises a first transform block and a second transform block; wherein the method comprises: determining, when the boundary between the first transform block and the second transform block is a transform block boundary and at least one of the first transform block and the second transform block has one or more non-zero transform coefficients, a value of a BS parameter for the boundary between the first transform block and the second transform block to be a first value; and performing de-blocking filtering process to the boundary between the first transform block and the second transform block at least based on the value of the boundary strength parameter.

17 Claims, 21 Drawing Sheets

Related U.S. Application Data

(60) Provisional application No. 62/797,163, filed on Jan. 25, 2019.

(51) Int. Cl.
  *H04N 19/176* (2014.01)
  *H04N 19/503* (2014.01)
  *H04N 19/61* (2014.01)

(58) Field of Classification Search
  CPC ...... H04N 19/503; H04N 19/61; H04N 19/70; H04N 19/86; H04N 19/96
  See application file for complete search history.

(56) References Cited

U.S. PATENT DOCUMENTS

| | | | |
|---|---|---|---|
| 2012/0141041 | A1 | 6/2012 | Song et al. |
| 2014/0369428 | A1 | 12/2014 | Park et al. |
| 2017/0064307 | A1 | 3/2017 | Jang |
| 2017/0237939 | A1* | 8/2017 | Han ................ H04N 19/80 348/14.08 |
| 2017/0237980 | A1* | 8/2017 | Han ................ H04N 19/115 375/240.18 |
| 2018/0176601 | A1 | 6/2018 | Jeong et al. |
| 2021/0297673 | A1* | 9/2021 | Zhang ............ H04N 19/176 |
| 2021/0321141 | A1* | 10/2021 | Jang .............. H04N 19/159 |
| 2022/0132144 | A1* | 4/2022 | Sauer ............ H04N 19/172 |

OTHER PUBLICATIONS

Wei-Jung Chien et al.,"CE8-related: CPR mode signaling and interaction with inter coding tools",oint Video Experts Team (JVET) of ITU-T SG 16 WP 3 and ISO/IEC JTC 1/SC 29/WG 11, 13th Meeting: Marrakech, MA, Jan. 9 18, 2019, Document: JVET-M0483-r2,total:7pages.

Document: JVET-L1001-v9, Benjamin Bross et al, Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, total 235 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems Infrastructure of audiovisual services—Coding of moving video, High efficiency video coding, total 692 pages.

M. Ikeda et al.,"CE11.1.6, CE11.1.7 and CE11.1.8: Joint proposals for long deblocking from Sony, Qualcomm, Sharp, Ericsson",oint Video Experts Team (JVET) of ITU-T SG 16 WP 3 and ISO/IEC JTC 1/SC 29/WG 11,13th Meeting: Marrakesh, MA, Jan. 9-18, 2019,Document: JVET-M0471,total:11pages.

Yin Zhao et al.,"CE6: Sub-block transform for inter blocks (CE6. 4.1)",oint Video Experts Team (JVET) of ITU-T SG 16 WP 3 and ISO/IEC JTC 1/SC 29/WG 11 13th Meeting: Marrakech, MA, Jan. 9-18, 2019,Document: JVET-M0140-v3, total:18pages.

Benjamin Bross et al.,"Versatile Video Coding (Draft 3)",Joint Video Experts Team (JVET) of ITU-T SG 16 WP 3 and ISO/IEC JTC 1/SC 29/WG 11,12th Meeting: Macao, CN, Oct. 3-12, 2018,Document: JVET-L1001-v9,total:235pages.

Kenneth Andersson et al.,."CE11: Deblocking for 4 × N, N × 4 and 8 × N and N × 8 block boundaries that not are aligned with 8×8 grid (test 11.2.1)", Joint Video Experts Team (JVET) of ITU-T SG 16 WP 3 and ISO/IEC JTC 1/SC 29/WG 11,13th Meeting: Marrakech, MA, Jan. 9-18, 2019,Document: JVET-M0299-v2,total:7pages.

\* cited by examiner

ENCODER, A DECODER AND CORRESPONDING METHODS OF DEBLOCKING FILTER ADAPTATION

CROSS-REFERENCE TO RELATED APPLICATIONS

This application is a continuation of International Application No. PCT/CN2020/074033, filed on Jan. 23, 2020, which claims the priority to U.S. Provisional Patent Application No. 62/797,163, filed Jan. 25, 2019. The disclosure of the aforementioned patent applications are hereby incorporated by reference in their entireties.

TECHNICAL FIELD

Embodiments of the present disclosure generally relates to the field of picture processing and particularly to an encoder, a decoder, and corresponding methods of deblocking filter adaptation, and more particularly to deblocking filter for transform block boundaries caused by a sub block transform, SBT coding tool.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

Block-based image coding schemes have in common that along the block edges, edge artifacts can appear. These artifacts are due to the independent coding of the coding blocks. These edge artifacts are often readily visible to a user. A goal in block-based image coding is to reduce edge artifacts below a visibility threshold. This is done by performing deblocking filtering. Such a deblocking filtering is on the one hand performed on decoding side in order to remove the visible edge artifacts, but also on encoding side, in order to prevent the edge artifacts from being encoded into the image at all.

However, the conventional approaches do not take into account that a discontinuity may arise for some cases in which edges between transform/coding blocks (such as transform/coding blocks having chroma samples or chroma components) using inter prediction. Thus, deblocking filtering can be challenging or even not yield the results expected.

SUMMARY

In view of the above-mentioned challenges, embodiments of the present application aims to provide a deblocking filter apparatus, an encoder, a decoder and corresponding methods that may mitigate or even remove blocking artifacts across the boundaries between transform/coding blocks (such as, transform blocks having chroma samples) using inter prediction, so as to improve coding efficiency.

Particularly, in the context of inter prediction, a sub block transform (SBT) coding tool is introduced and the SBT coding tool is applied for both luma and chroma samples, embodiments of the present application also aims to provide another deblocking filter apparatus, another encoder, another decoder and corresponding methods that may mitigate or even remove blocking artifacts that would be caused by sub block transform (SBT) coding tool, so as to improve coding efficiency.

Embodiments of the disclosure are defined by the features of the independent claims, and further advantageous implementations of the embodiments by the features of the dependent claims.

Particular embodiments are outlined in the attached independent claims, with other embodiments in the dependent claims.

The foregoing and other objects are achieved by the subject matter of the independent claims. Further implementation forms are apparent from the dependent claims, the description and the figures.

According to a first aspect of the present disclosure, there is provided a deblocking method, for deblocking a transform block boundary (internal edge) within a coding block in an image encoding and/or an image decoding, wherein the coding block is coded (predicted) in inter prediction mode and the coding block includes transform blocks (such as the coding block is divided (split) into transform blocks in/during the inter prediction process, in particular, when sub block transform is enabled, the current coding unit is divided into transform units) comprising a first transform block and a second transform block which is adjacent to the first transform block (for example, transform blocks containing p0 and q0 are adjacent in vertical or horizontal direction); wherein the method comprises:
  determining (or setting), when the boundary between the first transform block (such as the first transform block using inter prediction) and the second transform block (such as the second transform block using inter prediction) is a transform block boundary and at least one of the first transform block and the second transform block has one or more non-zero transform coefficients (one or more non-zero residual transform coefficients), a value of a boundary strength (BS) parameter for the boundary between the first transform block and the second transform block to be a first value; and
  performing de-blocking filtering process to the boundary between the first transform block and the second transform block at least based on the value of the boundary strength parameter.

It can be understood that the first and second transform blocks at sides of the transform block boundary use inter prediction. In an example, the samples of the coding block are chroma samples. In another example, the coding block has luma samples and chroma samples. Correspondingly, in an example, the samples of the first and second transform blocks are chroma samples. In another example, the first and second transform blocks both have luma samples and chroma samples. Specifically, according to the prior art, the deblocking filter process is applied to coding subblock edges and transform block edges of a picture, but edges within chroma components for which both sides of the edge use inter prediction are excluded. However, according to the first aspect of the present disclosure, it is allowed to de-block edges within chroma components for which both sides of the edge use inter prediction.

It can be understood that, in addition to the boundary strength (BS) parameter for the boundary between the first transform block and the second transform block, another parameters may be considered for the de-blocking filtering process. That is, depend on the particular filtering decision result, de-blocking filtering may be performed, in some cases no sample may be modified, or in another cases only one sample may be modified in each row or column perpendicular to and adjacent to the boundary.

It is noted that the term "block", "coding block" or "image block" is used in the present disclosure which can be applied for prediction units (PUs), coding units (CUs) etc. In VVC in general transform units and coding units are mostly aligned except in few scenarios when sub block transform (SBT) is used. It can be understood that the terms "block/image block/coding block" may be exchanged with each other in the present disclosure. The terms "sample/pixel" may be exchanged with each other in the present disclosure.

These boundaries between transform/coding blocks using inter prediction within chroma components were not considered to be filtered in prior art. According to the disclosure, however, the filtering process is improved to reduce the block artifact of the boundaries between transform/coding blocks having chroma samples and using inter prediction.

In a possible implementation form of the method according to the first aspect as such, the first transform block has residual data, and the second transform block has no residual data, or the first transform block has no residual data, and the second transform block has residual data.

In a possible implementation form of the method according to any preceding implementation of the first aspect as such, the transform blocks are sub block transform, SBT transform blocks.

In a possible implementation form of the method according to any preceding implementation of the first aspect or the first aspect as such, the number of transform blocks is 2 or 3 or other value.

In a possible implementation form of the method according to any preceding implementation of the first aspect or the first aspect as such, the boundary between the first transform block and the second transform block is a sub-block transform, SBT boundary.

In a possible implementation form of the method according to any preceding implementation of the first aspect or the first aspect as such, the determining, when the boundary between the first transform block and the second transform block is a transform block boundary and at least one of the first transform block and the second transform block has one or more non-zero transform coefficients, a value of a boundary strength parameter for the boundary between the first transform block and the second transform block to be a first value, comprises:

determining, when the boundary between the first transform block and the second transform block is a sub block transform, SBT boundary and at least one of the first transform block and the second transform block has one or more non-zero transform coefficients, a value of a boundary strength parameter for the boundary between the first transform block and the second transform block to be a first value.

In a possible implementation form of the method according to any preceding implementation of the first aspect or the first aspect as such, wherein the transform blocks further comprises a third transform block which is adjacent to the second transform block; the method further comprises:

determining, when the boundary between the second transform block and the third transform block is a sub block transform, SBT boundary and at least one of the second transform block and the third transform block has one or more non-zero transform coefficients, a value of a boundary strength parameter for the boundary between the second transform block and the third transform block to be a first value; or determining, when the boundary between the second transform block and the third transform block is a sub block transform, SBT boundary and both the second transform block and the third transform block have zero transform coefficients (all zero transform coefficients), a value of a boundary strength parameter for the boundary between the second transform block and the third transform block to be a second value.

In a possible implementation form of the method according to any preceding implementation or the first aspect as such, the first value is 1.

In a possible implementation form of the method according to any preceding implementation of the first aspect, the second value is zero.

In a possible implementation form of the method according to any preceding implementation of the first aspect or the first aspect as such, the transform block boundary between the first transform block and the second transform block is to be de-blocked (filtered) only if the transform block boundary between the first and second transform blocks is aligned with (overlapped with) an n×n sample grid, wherein n is an integer. Thereby, the computational load of the overall coding process may be further reduced.

In a possible implementation form of the method according to any preceding implementation of the first aspect or the first aspect as such, the transform block boundary between the first transform block and the second transform block is to be de-blocked (filtered) even if the transform blocks boundary between the first and second transform blocks is not aligned with (overlapped with) an n×n sample grid, wherein n is an integer. It is allowed to de-blocking the target boundaries, which is not aligned with an n×n grid.

In a possible implementation form of the method according to any preceding implementation of the first aspect, wherein n is 4 or 8. The prior art only considers boundaries that are overlapped with an 8×8 grid. In the disclosure, even if an SBT internal boundary is not aligned with the 8×8 grid when an asymmetric partition is applied, the internal boundary would be considered as filtering candidate. By also filtering SBT internal boundaries, the block artifact caused by SBT is reduced.

In a possible implementation form of the method according to any preceding implementation of the first aspect or the first aspect as such, samples of the first and second transform blocks are luma samples, or the first and second transform blocks have luma samples and chroma samples. Transform edges with both sides using inter prediction in chroma components, such as the one caused by SBT, can also result in block artifacts. In particular, when the main information of a video sequence is represented by chroma components (for example, the campfire sequence used in common test condition), such block artifacts can be serious. Therefore, this disclosure proposes to introduce deblocking filtering process for transform edges with its both sides using inter prediction in chroma components.

In a possible implementation form of the method according to any preceding implementation of the first aspect, wherein the n×n sample grid is 4×4 sample grid for the samples of the first and second transform blocks being luma samples; or, the n×n sample grid is 8×8 sample grid for the samples of the first and second transform blocks being chroma samples.

In a possible implementation form of the method according to any preceding implementation of the first aspect or the first aspect as such, wherein the coding block is divided in a horizontal or in a vertical direction.

In a possible implementation form of the method according to any preceding implementation of the first aspect or the first aspect as such, wherein, if the coding block is divided in a horizontal direction, the transform block boundary between the first transform block and the second transform block is a horizontal transform block boundary (a horizontal sub block transform, SBT boundary); or, if the coding block is divided in a vertical direction, the transform block boundary between the first transform block and the second transform block is a vertical transform block boundary (a vertical sub block transform, SBT boundary). The disclosure works for both vertical and horizontal transform block boundary.

In a possible implementation form of the method according to any preceding implementation of the first aspect or the first aspect as such, wherein the current coding block is coded using a sub block transform, SBT tool or the transform block boundary is performed by a sub block transform, SBT tool.

According to a second aspect of the present disclosure, there is provided a deblocking method, for deblocking block boundaries within a coding block (coding unit) in an image encoding and/or an image decoding, wherein the coding block is coded (predicted) in inter prediction mode (such as, the coding block is coded in a sub block transform, SBT mode) and the coding block (an inter-predicted coding block) includes transform blocks (the coding block is divided (split) into transform blocks in or during the inter prediction process, for example, when sub block transform is enabled, the current coding unit is divided into transform units) comprising a first transform block and a second transform block which is adjacent to the first transform block (for example, transform blocks contain p0 and q0 are adjacent in vertical or horizontal direction); wherein the method comprises: in response to a determination that a transform block boundary between the first transform block and the second transform block is to be filtered, determining, when the boundary between the first transform block and the second transform block is a sub block transform, SBT boundary and at least one of the first transform block and the second transform block has one or more non-zero transform coefficients, a value of a boundary strength parameter for the boundary between the first transform block and the second transform block to be a first value; and performing deblocking filtering process to the transform block boundary between the first transform block and the second transform block at least based on the value of the boundary strength parameter.

It can be understood that the first and second transform blocks at sides of the transform block boundary use inter prediction. In an example, the samples of the coding block are chroma samples. In an example, samples of the coding block are luma samples. In another example, the coding block has luma samples and chroma samples. Correspondingly, in an example, the samples of the first and second transform blocks are chroma samples, in another example, the samples of the first and second transform blocks are luma samples. In another example, the first and second transform blocks have luma samples and chroma samples. Specifically, according to the prior art, the deblocking filter process is applied to coding subblock edges and transform block edges of a picture, but edges within chroma components for which both sides of the edge use inter prediction are excluded, accordingly the internal SBT boundaries may be also excluded (because the SBT tool may be applied for both luma and chroma components). However, according to the second aspect of the present disclosure, it is allowed to de-block the internal SBT boundaries that is caused by sub block transform (SBT) coding tool, especially, it is allowed to de-block the internal SBT boundaries within chroma components that is caused by sub block transform (SBT) coding tool.

It can be understood that, in addition to the boundary strength (BS) parameter for the boundary between the first transform block and the second transform block, another parameters may be considered for the de-blocking filtering process. That is, depend on the particular filtering decision result, de-blocking filtering may be performed, in some cases no sample may be modified, or in another cases only one sample may be modified in each row or column perpendicular to and adjacent to the boundary.

A partitioning of an inter prediction block (i.e. an inter coding block short for a current coding block which is coded in inter prediction mode) into internal transform blocks is performed and the transformation is performed only for one of the transform blocks but not the other (because one transform block has residual data, the other does not have residual data). The transform blocks might symmetric (i.e. two same size sub-blocks) or asymmetric (i.e. sub-blocks are not of the same size). Such a partial transformation might result in block artifact along the boundaries between the internal transform blocks. These boundaries were not considered to be filtered in prior art, which compromises the subjective quality when Sub Block transform (SBT) is enabled. According to the second aspect of the disclosure, however, the filtering process is improved to reduce the block artifact of the SBT boundaries caused by the SBT coding tool. When detecting the boundaries that would be considered to be filtered, the internal boundaries between the internal transform blocks caused by the SBT coding tool are taken into account.

In a possible implementation form of the method according to the second aspect as such, wherein the first transform block has residual data, and the second transform block has no residual data, or the first transform block has no residual data, and the second transform block has residual data.

In a possible implementation form of the method according to any preceding implementation of the second aspect or the second aspect as such, wherein the transform blocks are sub block transform, SBT transform blocks.

In a possible implementation form of the method according to any preceding implementation of the second aspect or the second aspect as such, wherein the number of transform blocks is 2 or 3 or other value.

In a possible implementation form of the method according to any preceding implementation of the second aspect or the second aspect as such, the method further comprises:
determining whether the transform block boundary between the first transform block and the second transform block is to be filtered or not.

In a possible implementation form of the method according to any preceding implementation of the second aspect or the second aspect as such, wherein the in response to a determination that the transform block boundary between the first transform block and the second transform block is to be filtered, determining, when the boundary between the first transform block and the second transform block is a sub block transform, SBT boundary and at least one of the first transform block and the second transform block has one or more non-zero transform coefficients, a value of a boundary strength parameter for the boundary between the first transform block and the second transform block to be a first value, comprises:

in response to a determination that the transform block boundary between the first transform block and the second transform block is aligned with (overlapped with) an n×n sample grid, determining, when the boundary between the first transform block and the second transform block is a sub block transform, SBT boundary and at least one of the first transform block and the second transform block has one or more non-zero transform coefficients, a value of a boundary strength parameter for the boundary between the first transform block and the second transform block to be a first value, wherein n is an integer.

In a possible implementation form of the method according to any preceding implementation of the second aspect, wherein n is 4 or 8.

In a possible implementation form of the method according to any preceding implementation of the second aspect or the second aspect as such, wherein samples of the first and second transform blocks are luma samples, or the samples of the first and second transform blocks are chroma samples or the first and second transform blocks have luma samples and chroma samples.

In a possible implementation form of the method according to any preceding implementation of the second aspect, wherein the n×n sample grid is 4×4 sample grid for the samples of the first and second transform blocks being luma samples; or the n×n sample grid is 8×8 sample grid for the samples of the first and second transform blocks being chroma samples. It is found that transform edges with both sides using inter prediction in chroma components, such as the one caused by SBT, can also result in block artifacts. In particular, when the main information of a video sequence is represented by chroma components (for example, the campfire sequence used in common test condition), such block artifacts can be serious. Therefore, this disclosure proposes to introduce deblocking filtering process for transform edges with its both sides using inter prediction in chroma components In a possible implementation form of the method according to any preceding implementation of the second aspect or the second aspect as such, wherein the transform blocks further comprises: a third transform block which is adjacent to the second transform block; the method further comprises:

in response to a determination that a transform block boundary between the second transform block and the third transform block is aligned with (overlapped with) an n×n sample grid, determining, when the boundary between the second transform block and the third transform block is a sub block transform, SBT boundary and at least one of the second transform block and the third transform block has one or more non-zero transform coefficients, a value of a boundary strength parameter for the boundary between the second transform block and the third transform block to be a first value; or in response to a determination that the transform block boundary between the second transform block and the third transform block is aligned with (overlapped with) an n×n sample grid, determining, when the boundary between the second transform block and the third transform block is a sub block transform, SBT boundary and both the second transform block and the third transform block have zero transform coefficients, a value of a boundary strength parameter for the boundary between the second transform block and the third transform block to be a second value.

In a possible implementation form of the method according to any preceding implementation of the second aspect, wherein n is 4 or 8. It is found that 4×4 block edges occur to VVC more frequently than that in the HEVC. In HEVC, only quad tree partition is allowed for coding blocks, i.e. the resulting coding unit is always square. While in VVC, quad tree with multi-type tree partition is allowed, i.e. the partition can results in narrow 4×N or flat N×4 coding blocks. Furthermore, subblock partition tools such as SBT can further result in 4×N or N×4 transform block edges. Therefore, the grid size is set to 4×4 to consider filtering edges that was not overlapped with an 8×8 grid.

In a possible implementation form of the method according to any preceding implementation of the second aspect or the second aspect as such, wherein samples of the second and third transform blocks are luma samples, or the samples of the second and third transform blocks are chroma samples.

In a possible implementation form of the method according to any preceding implementation of the second aspect, wherein the n×n sample grid is 4×4 sample grid for the samples of the second and third transform blocks being luma samples; or the n×n sample grid is 8×8 sample grid for the samples of the second and third transform blocks being chroma samples.

In a possible implementation form of the method according to any preceding implementation of the second aspect or the second aspect as such, wherein the first value is 1.

In a possible implementation form of the method according to any preceding implementation of the second aspect, wherein the second value is zero.

In a possible implementation form of the method according to any preceding implementation of the second aspect or the second aspect as such, wherein the coding block is divided in a horizontal or in a vertical direction.

In a possible implementation form of the method according to any preceding implementation of the second aspect or the second aspect as such, wherein, if the coding block is divided in a horizontal direction, the transform block boundary between the first transform block and the second transform block is a horizontal transform block boundary; or
 if the coding block is divided in a vertical direction, the transform block boundary between the first transform block and the second transform block is a vertical transform block boundary.

In a possible implementation form of the method according to any preceding implementation of the second aspect or the second aspect as such, wherein the current coding block is coded using a sub block transform, SBT tool or the transform block boundary is caused by a sub block transform, SBT tool.

According to a third aspect of the present disclosure, there is provided a device for use in an image encoder and/or an image decoder, for deblocking a transform block boundary within a coding block, wherein the coding block is coded (predicted) in inter prediction mode and the coding block is divided (split) into transform blocks (for example, when sub block transform is enabled, the current coding unit is divided into two transform units) comprising a first transform block and a second transform block which is adjacent to the first transform block (for example, Transform blocks contain p0 and q0 are adjacent in vertical or horizontal direction); wherein the device comprises a de-blocking filter configured to:
  determine, when a boundary between the first transform block and the second transform block is a transform unit boundary and at least one of the first transform block and the second transform block has one or more non-zero transform coefficients, a value of a boundary strength parameter for the boundary between the first transform block and the second transform block to be a first value; and
  perform de-blocking filtering process to the boundary between the first transform block and the second transform block at least based on the value of the boundary strength parameter.

In a possible implementation form of the device according to the third aspect as such, wherein the first transform block has residual data, and the second transform block has no residual data, or the first transform block has no residual data, and the second transform block has residual data.

In a possible implementation form of the device according to any preceding implementation of the third aspect or the third aspect as such, wherein the transform blocks are sub block transform, SBT transform blocks.

In a possible implementation form of the device according to any preceding implementation of the third aspect or the third aspect as such, wherein the number of transform blocks is 2 or 3.

In a possible implementation form of the device according to any preceding implementation of the third aspect or the third aspect as such, wherein the boundary between the first transform block and the second transform block is a sub-block transform, SBT boundary.

In a possible implementation form of the device according to any preceding implementation of the third aspect or the third aspect as such, wherein the de-blocking filter is configured to:
  determine, when the boundary between a first transform block and a second transform block is a sub block transform, SBT boundary and at least one of the first transform block and the second transform block has one or more non-zero transform coefficients, a value of a boundary strength parameter for the boundary between the first transform block and the second transform block to be a first value.

In a possible implementation form of the device according to any preceding implementation of the third aspect or the third aspect as such, wherein the transform blocks further comprises a third transform block which is adjacent to the second transform block, and the de-blocking filter is further configured to determine, when the boundary between the second transform block and the third transform block is a sub block transform, SBT boundary and at least one of the second transform block and the third transform block has one or more non-zero transform coefficients, a value of a boundary strength parameter for the boundary between the second transform block and the third transform block to be a first value; or to determine, when the boundary between the second transform block and the third transform block is a sub block transform, SBT boundary and both the second transform block and the third transform block have zero transform coefficients, a value of a boundary strength parameter for the boundary between the second transform block and the third transform block to be a second value.

In a possible implementation form of the device according to any preceding implementation of the third aspect or the third aspect as such, wherein the first value is 1.

In a possible implementation form of the device according to any preceding implementation of the third aspect, wherein the second value is zero.

In a possible implementation form of the device according to any preceding implementation of the third aspect or the third aspect as such, wherein the transform block boundary between the first transform block and the second transform block is to be de-blocked only if the transform block boundary between the first and second transform blocks is aligned with (overlapped with) an n×n sample grid, wherein n is an integer.

In a possible implementation form of the device according to any preceding implementation of the third aspect or the third aspect as such, wherein the transform block boundary between the first transform block and the second transform block is to be de-blocked even if the transform blocks boundary between the first and second transform blocks is not aligned with (overlapped with) an n×n sample grid, wherein n is an integer.

In a possible implementation form of the device according to any preceding implementation of the third aspect, wherein n is 4 or 8.

In a possible implementation form of the device according to any preceding implementation of the third aspect or the third aspect as such, wherein samples of the first and second transform blocks are luma samples, or the samples of the first and second transform blocks are chroma samples.

In a possible implementation form of the device according to any preceding implementation of the third aspect, wherein the n×n sample grid is 4×4 sample grid for the samples of the first and second transform blocks being luma samples; or the n×n sample grid is 8×8 sample grid for the samples of the first and second transform blocks being chroma samples.

In a possible implementation form of the device according to any preceding implementation of the third aspect or the third aspect as such, wherein the coding block is divided in a horizontal or in a vertical direction.

In a possible implementation form of the device according to any preceding implementation of the third aspect or the third aspect as such, wherein, if the coding block is divided in a horizontal direction, the transform block boundary between the first transform block and the second transform block is a horizontal transform block boundary; or if the coding block is divided in a vertical direction, the transform block boundary between the first transform block and the second transform block is a vertical transform block boundary.

In a possible implementation form of the device according to any preceding implementation of the third aspect or the third aspect as such, wherein the current coding block is coded using a sub block transform, SBT tool or the transform block boundary is caused by a sub block transform, SBT tool.

According to a fourth aspect of the present disclosure, there is provided a device for use in an image encoder and/or an image decoder, for deblocking block boundaries within a coding block (coding unit), wherein the coding block is coded (predicted) in inter prediction mode (the coding block is coded in a sub block transform, SBT mode) and the coding block (an inter-predicted coding block) is divided (split) into transform blocks (for example, when sub block transform is enabled, the current coding unit is divided into two transform units) comprising a first transform block and a second transform block which is adjacent to the first transform block (in the inter prediction process, for example, Transform blocks contain p0 and q0 are adjacent in vertical or horizontal direction); wherein the device comprises a de-blocking filter configured to:

in response to a determination that a transform block boundary between the first transform block and the second transform block is to be filtered, determine, when the boundary between the first transform block and the second transform block is a sub block transform, SBT boundary and at least one of the first transform block and the second transform block has one or more non-zero transform coefficients, a value of a boundary strength parameter for the boundary between the first transform block and the second transform block to be a first value; and perform deblocking filtering process to the transform block boundary between the first transform block and the second transform block at least based on the value of the boundary strength parameter.

In a possible implementation form of the device according to any preceding implementation of the fourth aspect, wherein the first transform block has residual data, and the second transform block has no residual data, or the first transform block has no residual data, and the second transform block has residual data.

In a possible implementation form of the device according to any preceding implementation of the fourth aspect or the fourth aspect as such, wherein the transform blocks are sub block transform, SBT transform blocks.

In a possible implementation form of the device according to any preceding implementation of the fourth aspect or the fourth aspect as such, wherein the number of transform blocks is 2 or 3.

In a possible implementation form of the device according to any preceding implementation of the fourth aspect or the fourth aspect as such, the method further comprises determining whether the transform block boundary between the first transform block and the second transform block is to be filtered or not.

In a possible implementation form of the device according to any preceding implementation of the fourth aspect or the fourth aspect as such, wherein the de-blocking filter is configured to:

in response to a determination that the transform block boundary between the first transform block and the second transform block is aligned with (overlapped with) an n×n sample grid, determine, when the boundary between the first transform block and the second transform block is a sub block transform, SBT boundary and at least one of the first transform block and the second transform block has one or more non-zero transform coefficients, a value of a boundary strength parameter for the boundary between the first transform block and the second transform block to be a first value, wherein n is an integer.

In a possible implementation form of the device according to any preceding implementation of the fourth aspect or the fourth aspect as such, wherein n is 4 or 8.

In a possible implementation form of the device according to any preceding implementation of the fourth aspect or the fourth aspect as such, wherein samples of the first and second transform blocks are luma samples, or the samples of the first and second transform blocks are chroma samples, or the first and second transform blocks have luma samples and chroma samples. It is found that transform edges with both sides using inter prediction in chroma components, such as a transform edge caused by SBT, can also result in block artifacts. In particular, when the main information of a video sequence is represented by chroma components (for example, the campfire sequence used in common test condition), such block artifacts can be serious. Therefore, this disclosure proposes to introduce a deblocking filtering process for transform edges with its both sides using inter prediction in chroma components.

In a possible implementation form of the device according to any preceding implementation of the fourth aspect, wherein the n×n sample grid is 4×4 sample grid for the samples of the first and second transform blocks being luma samples; or the n×n sample grid is 8×8 sample grid for the samples of the first and second transform blocks being chroma samples. It is found that 4×4 block edges occur in VVC more frequently than that in the HEVC. In HEVC, only quad tree partition is allowed for coding blocks, i.e. the resulting coding unit is always a square. While in VVC, quad tree with multi-type tree partition is allowed, i.e. the partition can results in narrow 4×N or flat N×4 blocks. Furthermore, subblock partition tools such as SBT can further result in 4×N or N×4 transform block edges. Therefore, the grid size is set to 4×4 to consider filtering edges that are not overlapped with an 8×8 grid.

In a possible implementation form of the device according to any preceding implementation of the fourth aspect or the fourth aspect as such, wherein the transform blocks further comprising a third transform block which is adjacent to the second transform block;

the de-blocking filter is further configured to:

in response to a determination that a transform block boundary between the second transform block and the third transform block is aligned with (overlapped with) an n×n sample grid, determine, when the boundary between the second transform block and the third transform block is a sub block transform, SBT boundary and at least one of the second transform block and the third transform block has one or more non-zero transform coefficients, a value of a boundary strength parameter for the boundary between the second transform block and the third transform block to be a first value; or in response to a determination that the transform block boundary between the second transform block and the third transform block is aligned with (overlapped with) an n×n sample grid, determine, when the boundary between the second transform block and the third transform block is a sub block transform, SBT boundary and both the second transform block and the third transform block have zero transform coefficients, a value of a boundary strength parameter for the boundary between the second transform block and the third transform block to be a second value.

In a possible implementation form of the device according to any preceding implementation of the fourth aspect, wherein n is 4 or 8.

In a possible implementation form of the device according to any preceding implementation of the fourth aspect or the fourth aspect as such, wherein samples of the second and third transform blocks are luma samples, or the samples of the second and third transform blocks are chroma samples.

In a possible implementation form of the device according to any preceding implementation of the fourth aspect or the fourth aspect as such, wherein the n×n sample grid is 4×4 sample grid for the samples of the second and third transform blocks being luma samples; or the n×n sample grid is 8×8 sample grid for the samples of the second and third transform blocks being chroma samples.

In a possible implementation form of the device according to any preceding implementation of the fourth aspect or the fourth aspect as such, wherein the first value is 1.

In a possible implementation form of the device according to any preceding implementation of the fourth aspect, wherein the second value is zero.

In a possible implementation form of the device according to any preceding implementation of the fourth aspect or the fourth aspect as such, wherein the coding block is divided in a horizontal or in a vertical direction.

In a possible implementation form of the device according to any preceding implementation of the fourth aspect or the fourth aspect as such, wherein, if the coding block is divided in a horizontal direction, the transform block boundary between the first transform block and the second transform block is a horizontal transform block boundary; or, if the coding block is divided in a vertical direction, the transform block boundary between the first transform block and the second transform block is a vertical transform block boundary.

In a possible implementation form of the device according to any preceding implementation of the fourth aspect or the fourth aspect as such, wherein the current coding block is coded using a sub block transform, SBT tool or the transform block boundary is caused by a sub block transform, SBT tool.

According to a fifth aspect of the present disclosure, there is provided an encoder comprising processing circuitry for carrying out the method according to any preceding implementation of the first aspect or the first aspect as such or the method according to any preceding implementation of the second aspect or the second aspect as such.

According to a sixth aspect of the present disclosure, there is provided a decoder comprising processing circuitry for carrying out the method according to any preceding implementation of the first aspect or the first aspect as such or the method according to any preceding implementation of the second aspect or the second aspect as such.

According to a seventh aspect of the present disclosure, there is provided a computer program product comprising a program code for performing the method according to any preceding implementation of the first aspect or the first aspect as such or the method according to any preceding implementation of the second aspect or the second aspect as such.

According to an eighths aspect of the present disclosure, there is provided a non-transitory computer-readable medium carrying a program code which, when executed by a computer device, causes the computer device to perform the method according to any preceding implementation of the first aspect or the first aspect as such or the method according to any preceding implementation of the second aspect or the second aspect as such.

According to a ninth aspect of the present disclosure, there is provided a decoder, comprising: one or more processors; and a non-transitory computer-readable storage medium coupled to the processors and storing programming for execution by the processors, wherein the programming, when executed by the processors, configures the decoder to carry out the method according to any preceding implementation of the first aspect or the first aspect as such or the method according to any preceding implementation of the second aspect or the second aspect as such.

According to a tenth aspect of the present disclosure, there is provided an encoder, comprising: one or more processors; and a non-transitory computer-readable storage medium coupled to the processors and storing programming for execution by the processors, wherein the programming, when executed by the processors, configures the encoder to carry out the method according to any preceding implementation of the first aspect or the first aspect as such or the method according to any preceding implementation of the second aspect or the second aspect as such.

According to an eleventh aspect of the present disclosure, it is provided a deblocking filter apparatus, for deblocking a transform block boundary within a coding block, wherein the coding block is coded (predicted) in inter prediction mode and the coding block comprises transform blocks (such as, the coding block is divided (split) into transform blocks during the inter prediction process, for example, when sub block transform is enabled, the current coding unit is divided into two transform units) comprising a first transform block and a second transform block which is adjacent to the first transform block; wherein the de-blocking filter comprising means for determining, when the boundary between the first transform block and the second transform block is a transform block boundary and at least one of the first transform block and the second transform block has one or more non-zero transform coefficients, a value of a boundary strength, BS, parameter for the boundary between the first transform block and the second transform block to be a first value, and means for performing de-blocking filtering process to the boundary between the first transform block and the second transform block at least based on the first value of the BS parameter.

According to a twelfth aspect of the present disclosure, it is provided a deblocking filter apparatus, for deblocking block boundaries within a coding block (coding unit), wherein the coding block is coded (predicted) in inter prediction mode (in particular, the coding block is coded in a sub block transform, SBT mode) and the coding block (an inter-predicted coding block is divided (split) into transform blocks in the inter prediction process, for example, when sub block transform is enabled, the current coding unit is divided into two transform units) comprising a first transform block and a second transform block which is adjacent to the first transform block (for example, Transform blocks contain p0 and q0 are adjacent in vertical or horizontal direction), the deblocking filter apparatus comprising means for in response to a determination that a transform block boundary between the first transform block and the second transform block is to be filtered, determining, when the boundary between the first transform block and the second transform block is a sub block transform, SBT, boundary and at least one of the first transform block and the second transform block has one or more non-zero transform coefficients, a value of a boundary strength parameter for the boundary between the first transform block and the second transform block to be a first value, and means for performing a deblocking filtering process to the transform block boundary between the first transform block and the second transform block at least based on the value of the boundary strength parameter.

The method according to the first aspect of the disclosure, i.e., determining, when the boundary between the first transform block and the second transform block is a transform block boundary and at least one of the first transform block and the second transform block has one or more non-zero transform coefficients, a value of a boundary strength, BS, parameter for the boundary between the first transform block and the second transform block to be a first value; and performing de-blocking filtering process to the boundary between the first transform block and the second transform block at least based on the first value of the BS parameter can be performed by the apparatus according to the eleventh aspect of the disclosure. Further features and implementation forms of the apparatus according to the eleventh aspect of the disclosure correspond to the features and implementation forms of the method according to the first aspect of the disclosure.

The method according to the second aspect of the disclosure, i.e., in response to a determination that a transform block boundary between the first transform block and the second transform block is to be filtered, determining, when the boundary between the first transform block and the second transform block is a sub block transform, SBT, boundary and at least one of the first transform block and the second transform block has one or more non-zero transform coefficients, a value of a boundary strength parameter for the boundary between the first transform block and the second transform block to be a first value, and performing deblocking filtering process to the transform block boundary between the first transform block and the second transform block at least based on the value of the boundary strength parameter can be performed by the apparatus according to the twelfth aspect of the disclosure. Further features and implementation forms of the apparatus according to the twelfth aspect of the disclosure correspond to the features and implementation forms of the method according to the second aspect of the disclosure.

The apparatus according to the aspect can be extended into implementation forms corresponding to the implementation forms of a method according to the any preceding aspect. Hence, an implementation form of the apparatus comprises the feature(s) of the corresponding implementation form of the method according to the any preceding aspect. The advantages of the apparatuses according to the any preceding aspect are the same as those for the corresponding implementation forms of the method according to the any preceding aspect.

According to a further aspect the disclosure relates to an apparatus for decoding a video stream includes a processor and a memory. The memory is storing instructions that cause the processor to perform the method according to the first aspect.

According to a further aspect the disclosure relates to an apparatus for encoding a video stream includes a processor and a memory. The memory is storing instructions that cause the processor to perform the method according to the first aspect.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
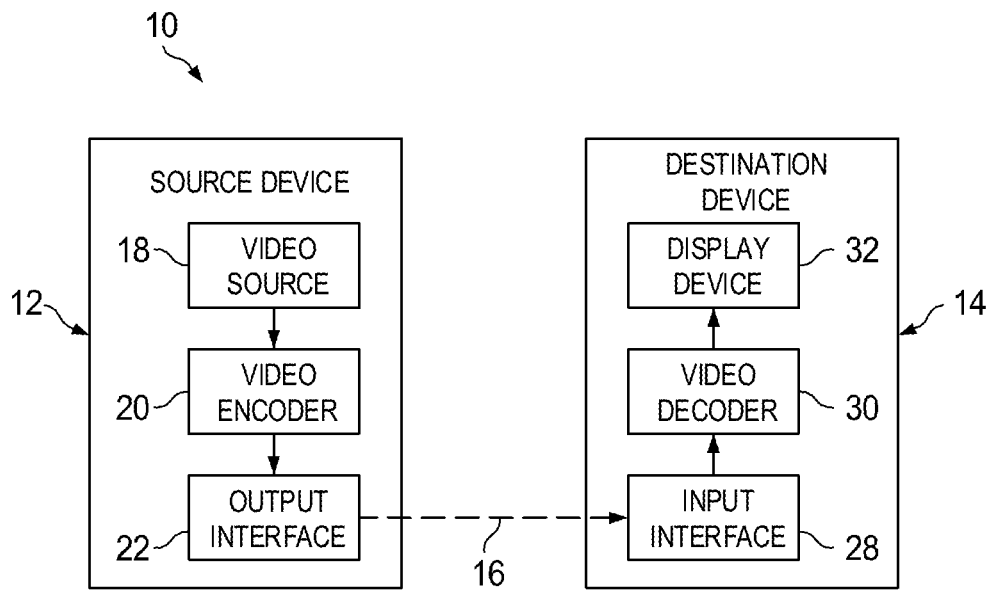
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
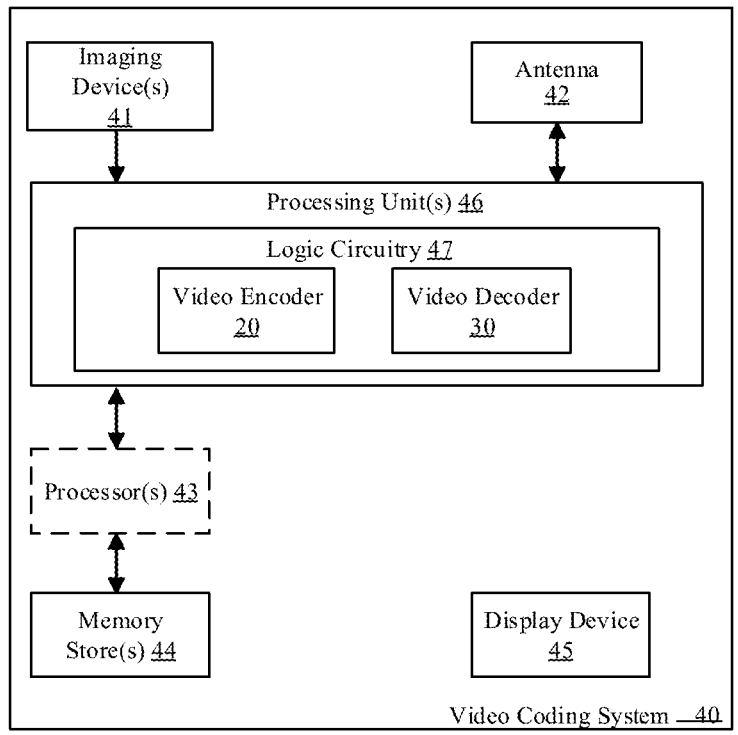
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
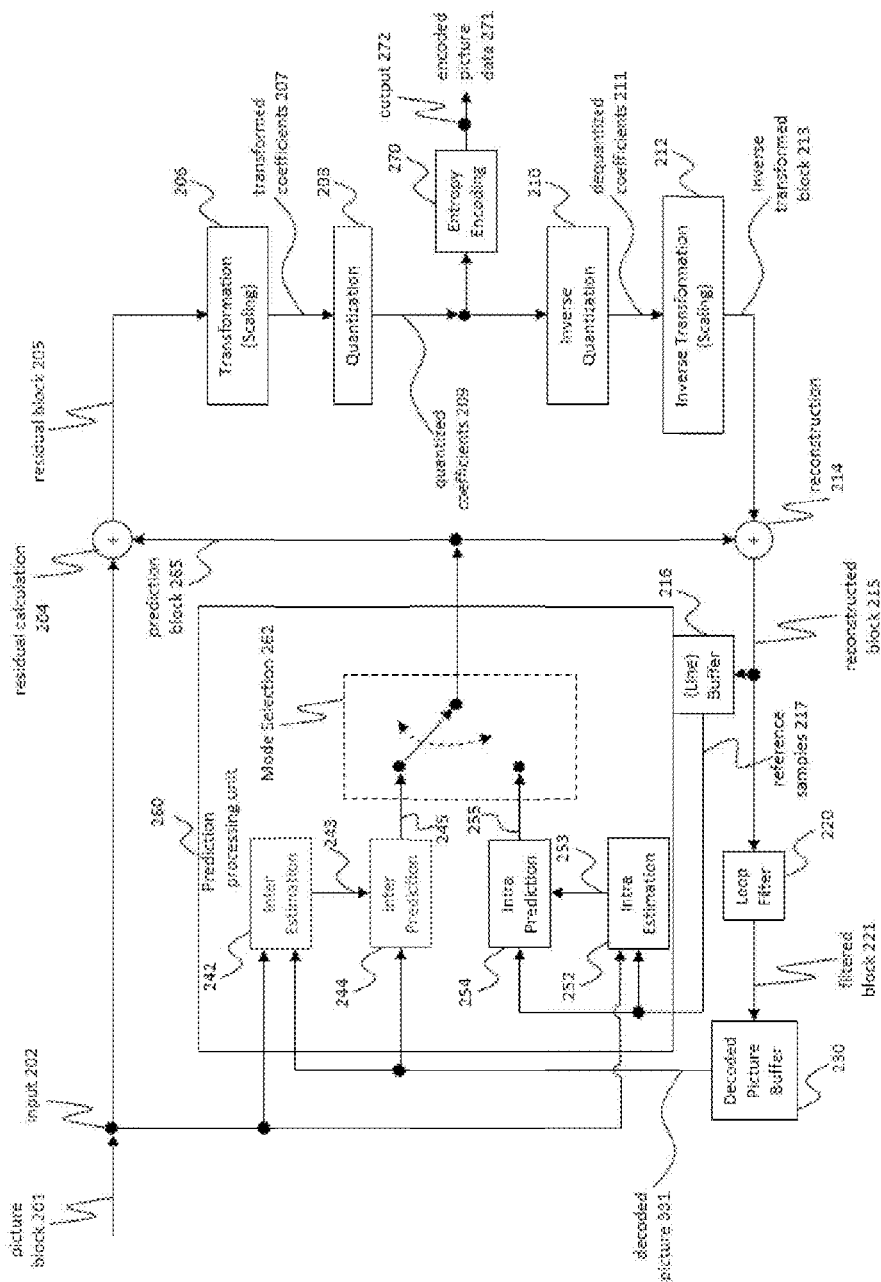
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 202 (or input interface 202), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
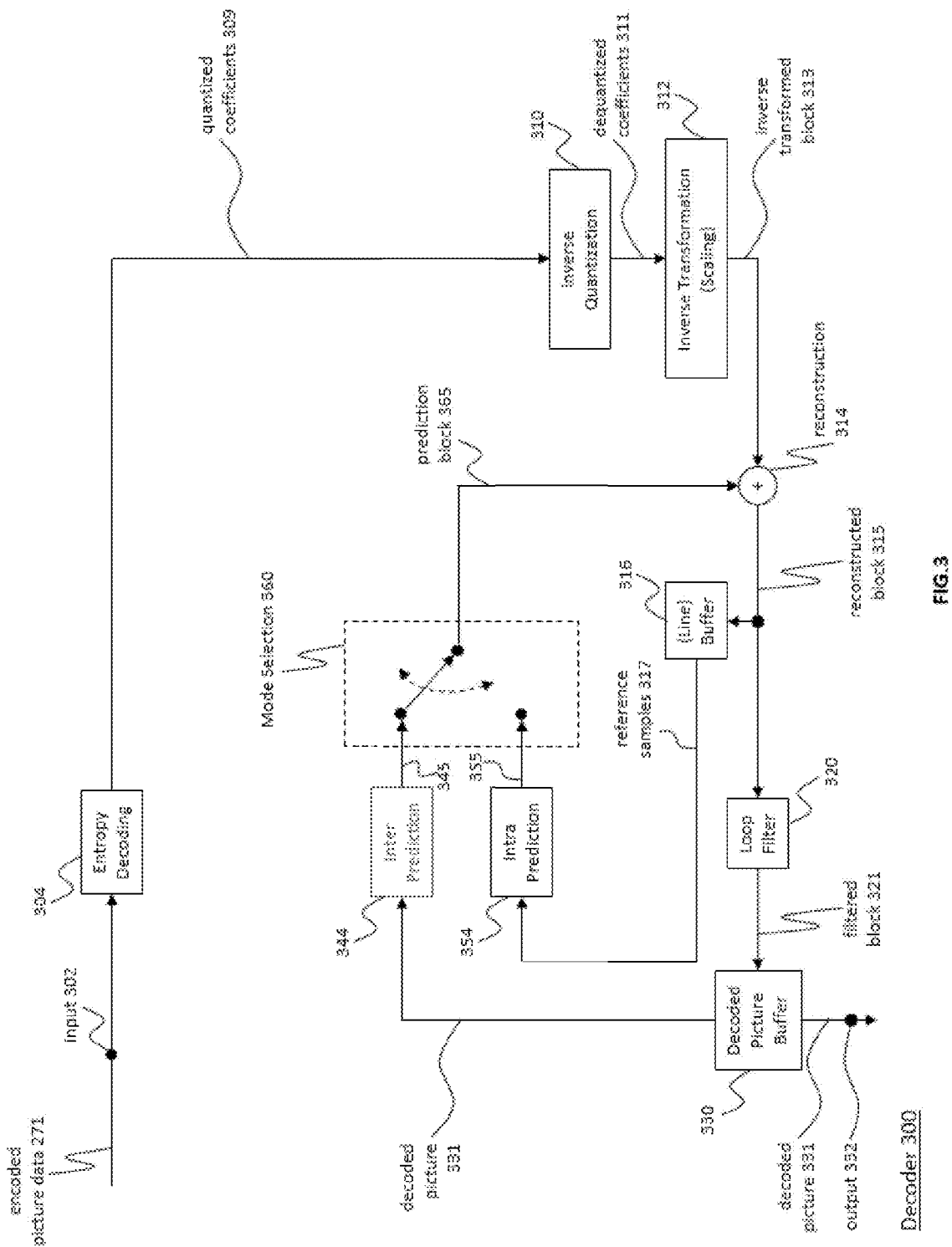
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 202, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 201. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 201 of the picture 17, e.g. one, several or all blocks forming the picture 17. The picture block 201 may also be referred to as current picture block or picture block to be coded.

Like the picture 17, the picture block 201 again is or can be regarded as a two-dimensional array or matrix of samples with intensity values (sample values), although of smaller dimension than the picture 17. In other words, the block 201 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 201 define the size of block 201. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g. the encoding and prediction is performed per block 201.

Residual Calculation

The residual calculation unit 204 may be configured to calculate a residual block 205 (also referred to as residual 205) based on the picture block 201 and a prediction block 265 (further details about the prediction block 265 are provided later), e.g. by subtracting sample values of the prediction block 265 from sample values of the picture block 201, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP).

For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as (reconstructed) transform block 213.

Reconstruction

The reconstruction unit 214 (e.g. adder or summer 214) is configured to add the (reconstructed) transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221. In the present disclosure, the improved loop filter, particularly the improved de-blocking filter apparatus is provided and will introduce in details later.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 201 (current block 201 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 201 into smaller block partitions or sub-blocks (which form again blocks), e.g. iteratively using quad-tree-partitioning (QT), binary-tree partitioning (BT) or triple-tree-partitioning (TT) or any combination thereof, and to perform, e.g., the prediction for each of the block partitions or sub-blocks, wherein the mode selection comprises the selection of the tree-structure of the partitioned block 201 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 201 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT). In the present disclosure, during the inter prediction, the coding block is divided into transform blocks when SBT coding tool is applied.

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate color planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate color planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 271 (corresponds to encoded picture data 21), so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 201 (current picture block 201 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice. In the present disclosure, during the inter prediction, the coding block is divided into transform blocks when sub block transform (SBT) is enabled (e.g. when SBT coding tool is applied).

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 271 (corresponds to encoded picture data 21) which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30. In the present disclosure, some syntax elements such as, cu_sbt_flag and cu_sbt_horizontal_flag may be encoded into the bitstream 21.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 271 (corresponds to encoded picture data 21) (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 271 (corresponds to encoded picture data 21)) and perform, for example, entropy decoding to the encoded picture data 271 (corresponds to encoded picture data 21) to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 271 (corresponds to encoded picture data 21) (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 271 (corresponds to encoded picture data 21) (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter. In the present disclosure, the improved loop filter, particularly the improved de-blocking filter apparatus is provided and will be described in details later.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 271 (corresponds to encoded picture data 21) (e.g. by parsing and/or decoding, e.g. by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 271 (corresponds to encoded picture data 21). For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is −32768~32767; if bitDepth is set equal to 18, the range is −131072~131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel.

Figure 4:
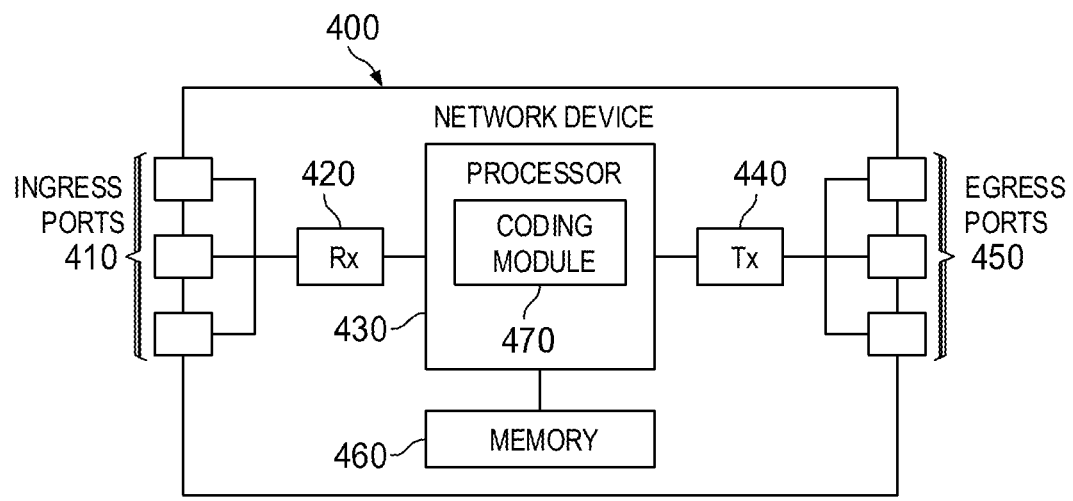
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an over-flow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
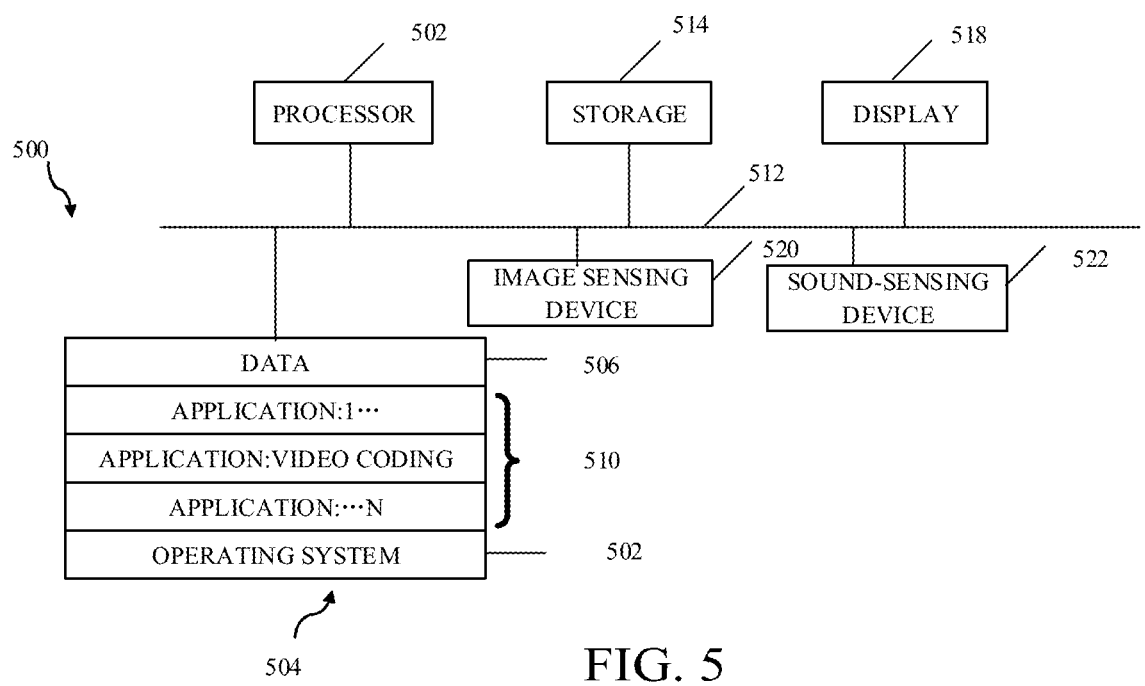
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Combined Inter-Intra Prediction (CIIP)

Conventionally, a coding unit is either intra-predicted (i.e. using the reference samples in the same picture) or inter-predicted (i.e. using the reference samples in other pictures). The combined inter-intra prediction combines these two prediction approaches. Therefore, it is sometimes also called as combined inter-intra prediction (CIIP). When combined inter-intra prediction is enabled, the intra-predicted and inter-predicted samples are applied by weights, and the final prediction is derived as the weighted average samples. A flag, CIIP flag, is used to indicate when a block is applied with combined inter-intra prediction.

A SubBlock Transform (SBT) coding tool partitions (i.e. splits or divides) an inter prediction block (i.e. an inter coding block short for a current coding block which is coded in inter prediction mode) into two transform blocks and perform the transform only for one of the transform blocks but not the other. The two transform blocks might be symmetric (i.e. two same size transform blocks) or asymmetric (i.e. two transform blocks with a same width but a 1:3 height, for example, or with a same height but with a 1:3 width, for example). Such a partial transform might result in block artifact along the boundaries between the two transform blocks. However, these boundaries were not considered to be filtered in the prior art, which compromises the subjective quality when SBT is enabled.

An improved filtering process is proposed to reduce the block artifact of the transform blocks boundaries caused by SBT. When detecting the boundaries that would be considered to be filtered, the internal boundaries between the transform blocks caused by SBT is taken into account. Furthermore, the prior art only consider boundaries that are overlapped with an 8×8 grid. In the disclosure, even if an SBT internal boundary is not aligned with the 8×8 grid when an asymmetric partitioning (i.e., splitting or dividing) is applied, the internal boundary would be considered as filtering candidate. By also filtering SBT internal boundaries, the block artifact caused by SBT is reduced.

Figure 6:
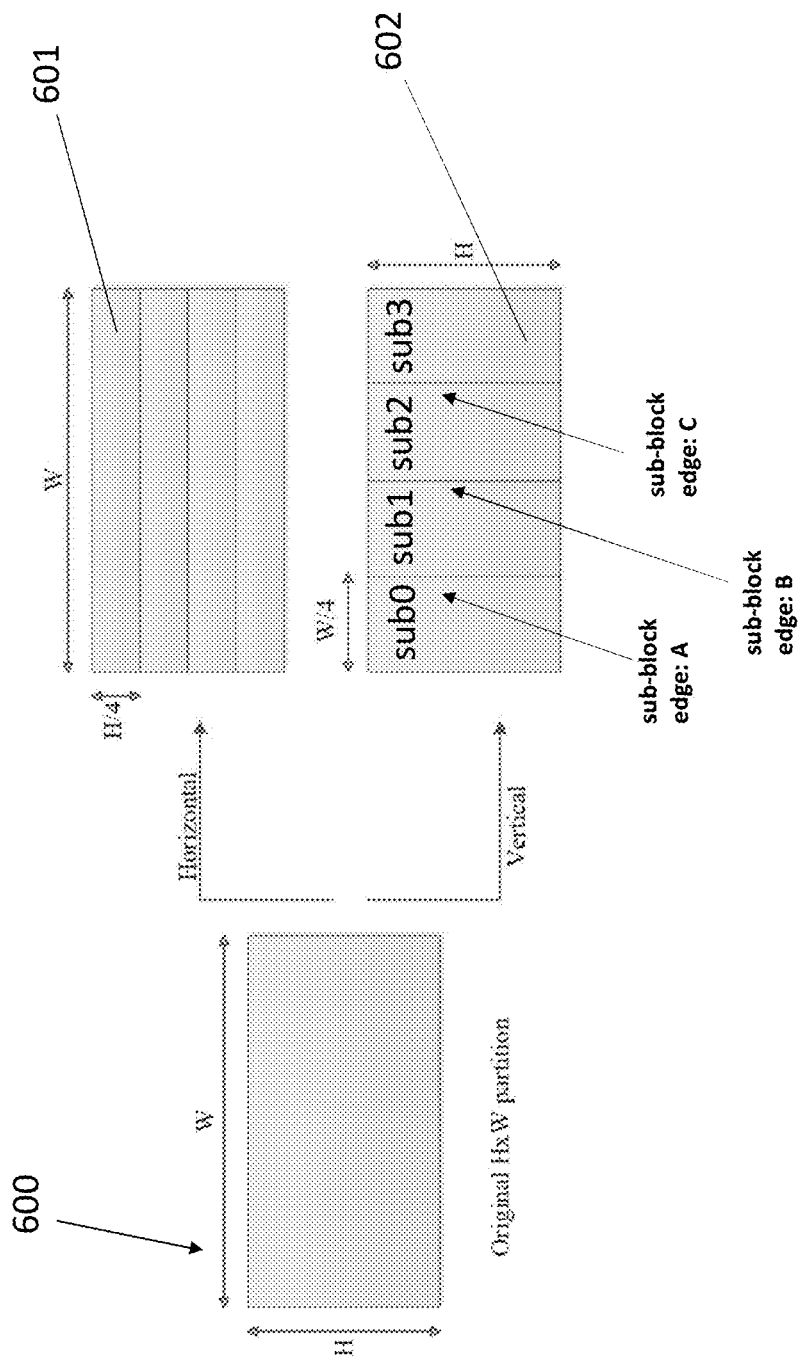
FIG. 6 is a block diagram illustrating an example of deblocking sub partition edges within a coding unit (CU)

A block 600 applied with CIIP can be further divided into several sub-blocks, as shown in FIG. 6. In FIG. 6 all sub block boundaries within a CU are applied with combined inter-intra prediction (CIIP). In one example, its sub-blocks 601 are derived by dividing the block in horizontal direction, with each sub block has a same width as the original block but ¼ height of the original block.

In one example, its sub-blocks 602 are derived by divide the block in vertical direction, with each sub block has a same height as the original block but 14 width of the original block. In the example showed in the FIG. 6, the sub-partitions and the corresponding boundaries with the vertical partition 602 are labeled. Herein, the intra block 600 is divided into four sub-partitions, namely, sub0, sub1, sub2, and sub3. Three sub-partition boundaries are labeled, namely, sub-partition boundary A between sub-partition 0 and 1, sub-partition boundary B between sub-partition 1 and 2, sub-partition boundary C between sub-partition 2 and 3, similar definition may be used in the example of horizontal partition 601.

Blocking artifacts might be introduced due to CIIP prediction, as it involves results with intra prediction which usually has more residual signals. The blocking artifacts not only occurs to boundaries of CIIP block, but also the sub-block edges inside a CIIP block, such as vertical sub-block edge A, B, C in FIG. 6. The horizontal sub-block edges can be identified correspondingly.

Although block artifacts can occur to both CIIP boundaries and sub-block edges inside CIIP blocks, the distortion caused by these two boundaries might be different, and different boundaries strength might be needs.

The sub-block edges might be caused by CIIP itself, for example, if the intra prediction mode of a CIIP block is a horizontal mode, a vertical partition shown as FIG. 6 is applied, resulting three sub-blocks.

Figure 7:
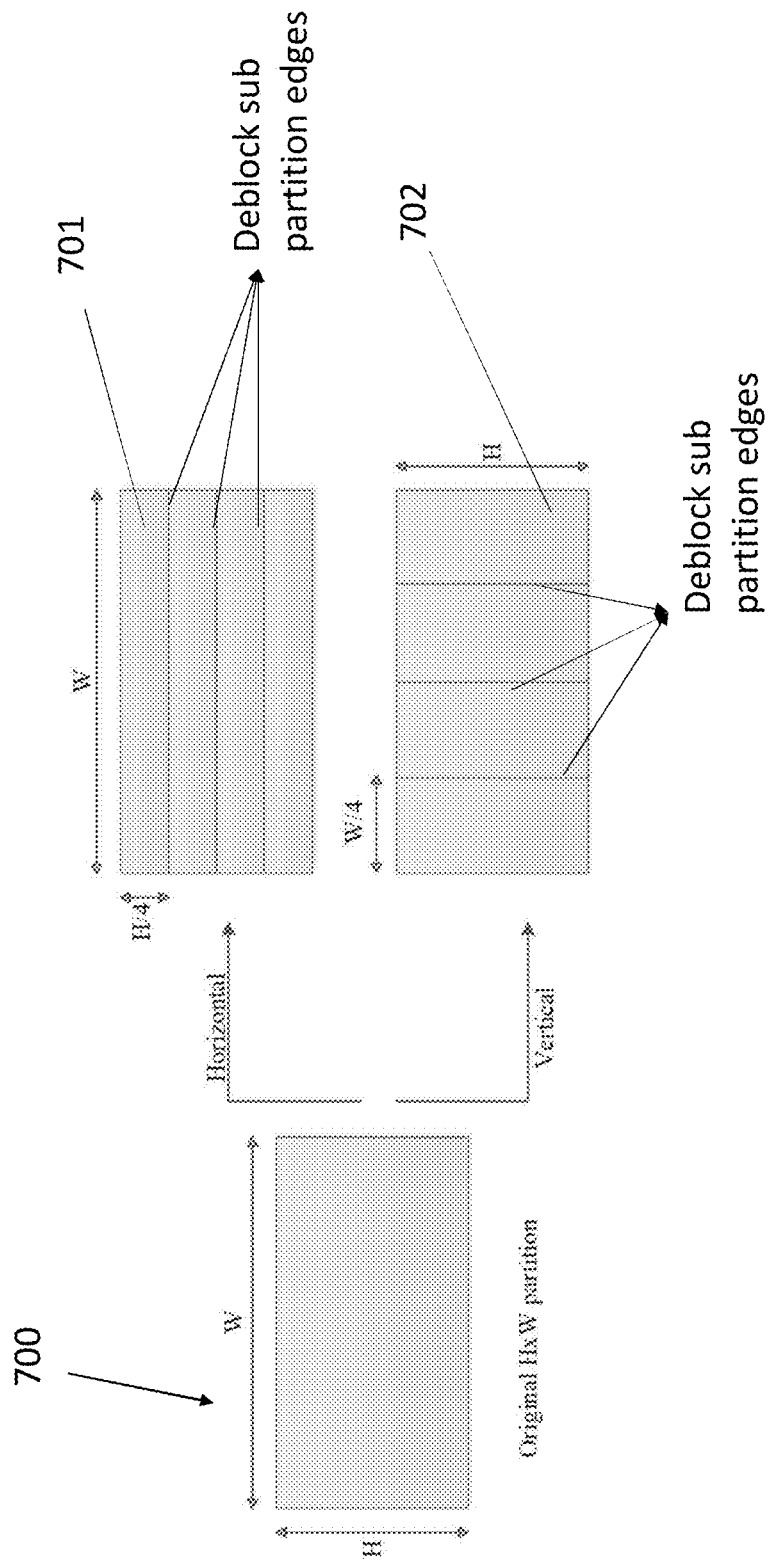
FIG. 7 is a block diagram illustrating another example of deblocking sub partition edges within a CU.

As shown in FIG. 7, in order to reduce the block artifacts, sub-block boundaries are deblocking filtered after horizontal partitioning of a coding block 700 into sub-blocks 701 or after vertical partitioning of a coding block 700 into sub-blocks 702. FIG. 7 shows to deblock all sub block edges within a CU applied with combined inter-intra prediction (CIIP).

Figure 8:
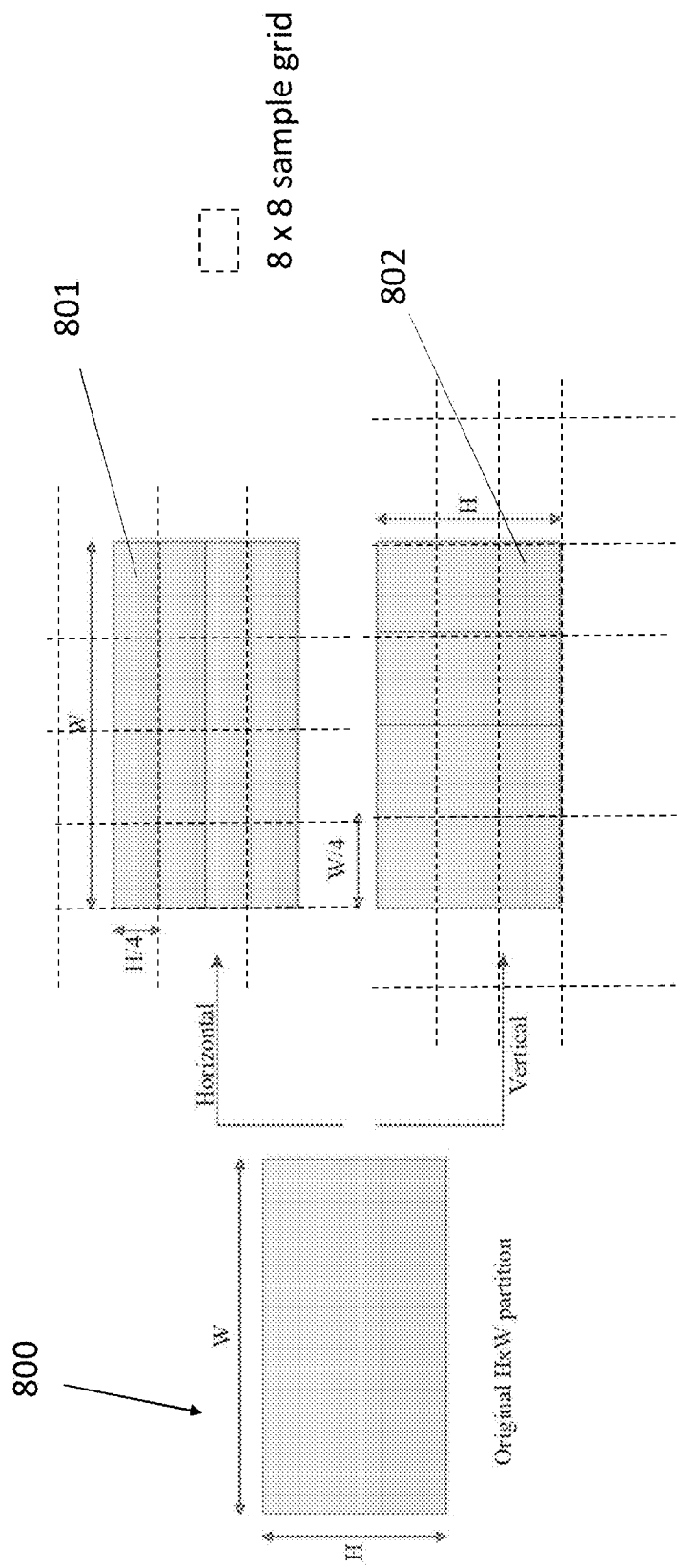
FIG. 8 is a block diagram illustrating an example of deblocking sub-block TU boundaries within a CU which overlap with an 8×8 sample grid.

FIG. 8 shows deblocking all sub-block TU boundaries within a CU which overlaps with (aligned with) an 8×8 sample grid not starting from the top-left sample of the CU, according to an example. As shown in FIG. 8, after horizontal partitioning of a coding block 800 into sub-blocks 801 or after vertical partitioning of a coding block 800 into sub-blocks 802, only sub-block boundaries which overlap with an 8×8 sample grid are deblocked and the rest of the sub-block edges are not deblocked. This has the advantage of reduced computational complexity as only few of the edges are deblocked.

Figure 9:
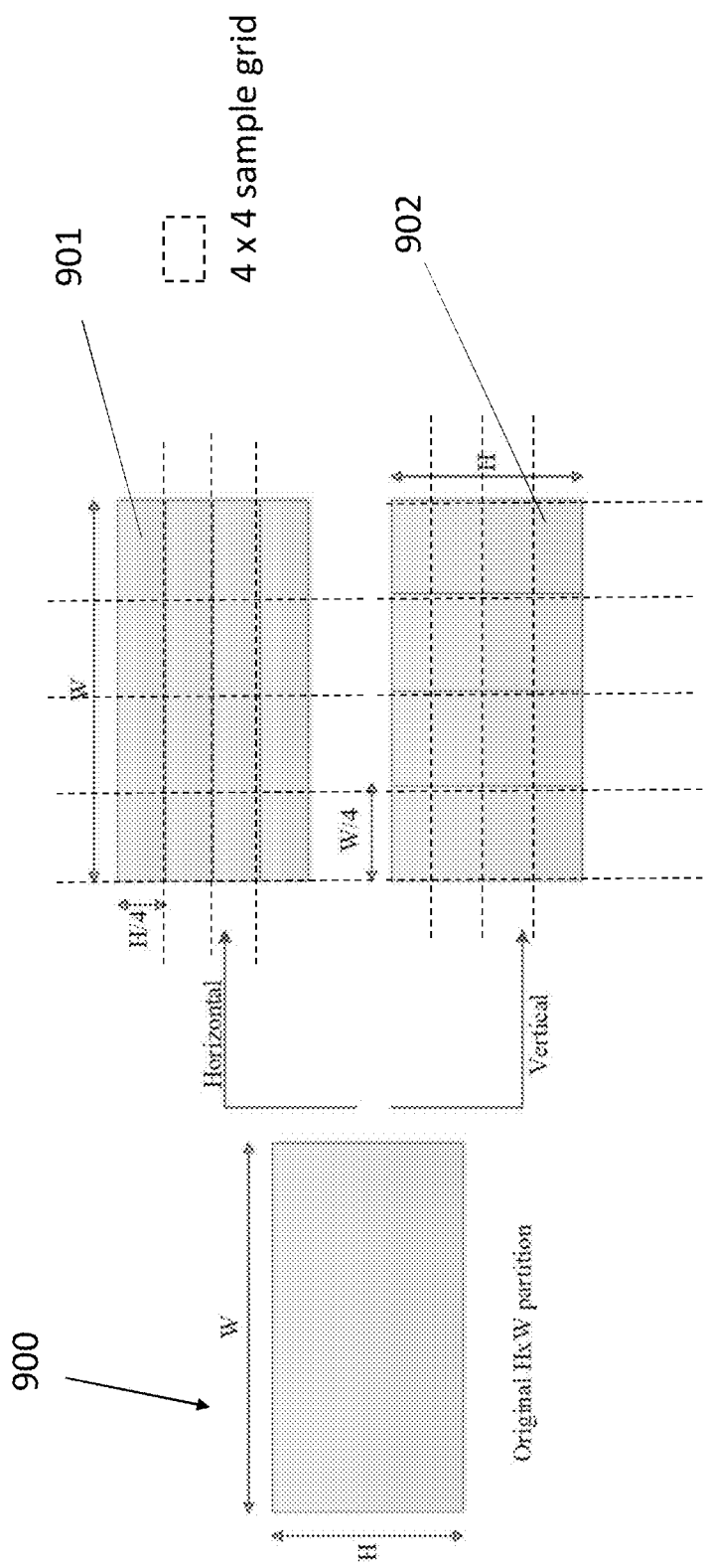
FIG. 9 is a block diagram illustrating an example of deblocking all sub-block TU boundaries within a CU which overlap with an 4×4 sample grid.

Another alternative is shown in FIG. 9. FIG. 9 shows deblocking all sub block edges within a CU which overlaps with a 4×4 sample grid. In this case, after horizontal partitioning of a coding block 900 into sub-blocks 901 or after vertical partitioning of a coding block 900 into sub-blocks 902, all sub-block boundaries which overlap with a 4×4 sample grid are deblocked.

Figure 10:
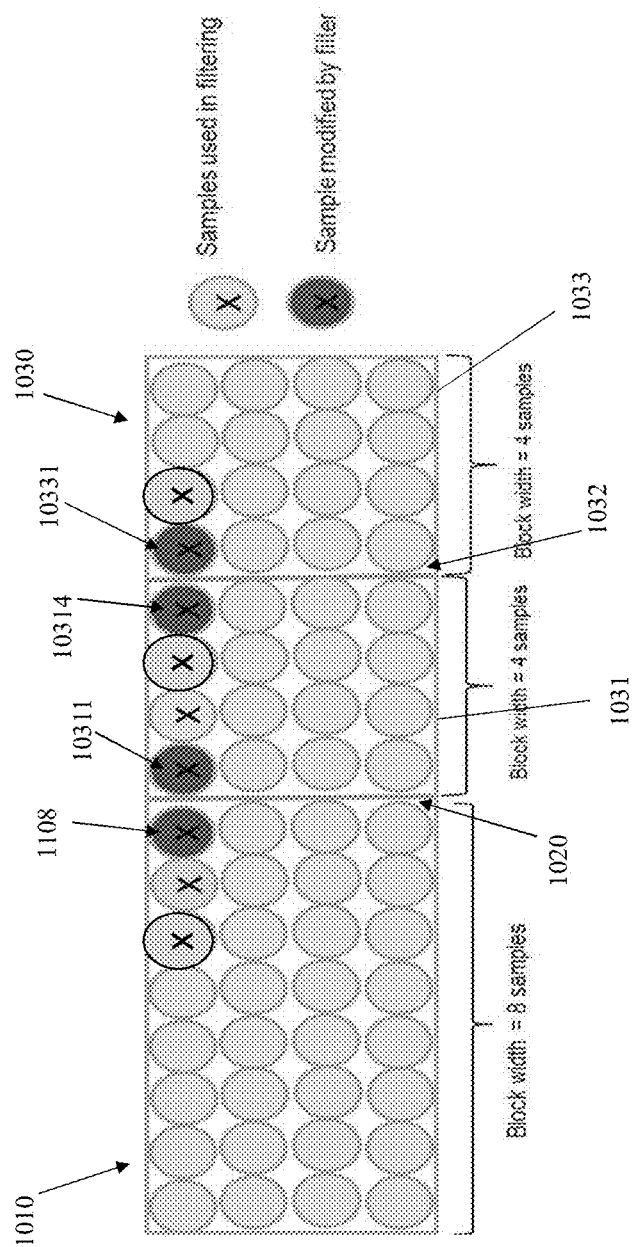
FIG. 10 is a block diagram illustrating an example according to which when sub-block size is <8 samples orthogonally in the direction of deblocking, then a weak filter which only uses 3 samples in deblocking decision and which modifies only one sample is used.

FIG. 10 shows the case when sub-block size is <8 samples orthogonally in direction of deblocking, then a weak filter which only uses 3 samples in decision and which modifies one sample is used. An example in FIG. 6 using vertical partition, if W is 16 samples, then each sub-block is 4 samples wide. In this case, as shown in FIG. 10, a weak filter that only modifies up to one sample 10314 or 10331 along the sub-block boundaries 1032 between the sub-block 1031 and the sub-block 1033 can be used. In the example shown in FIG. 10, filtering is performed in each row of the sub-blocks 1031, 1033 that is perpendicular to and adjacent to the sub-blocks boundary 1032 between the sub-block 1031 and the sub-block 1033, for example. As shown in FIG. 10, a weak filter that only modifies up to one sample 1108 or 10311 along the edge 1020 between the neighboring block 1010 and the current block 1030 can be used. In another example shown in FIG. 10, filtering is performed in each row of the sub-block 1031 or the neighboring block 1010 that is perpendicular to and adjacent to the edge 1020 between the neighboring block 1010 and the sub-block 1031 of the block 1030, for example.

Figure 11:
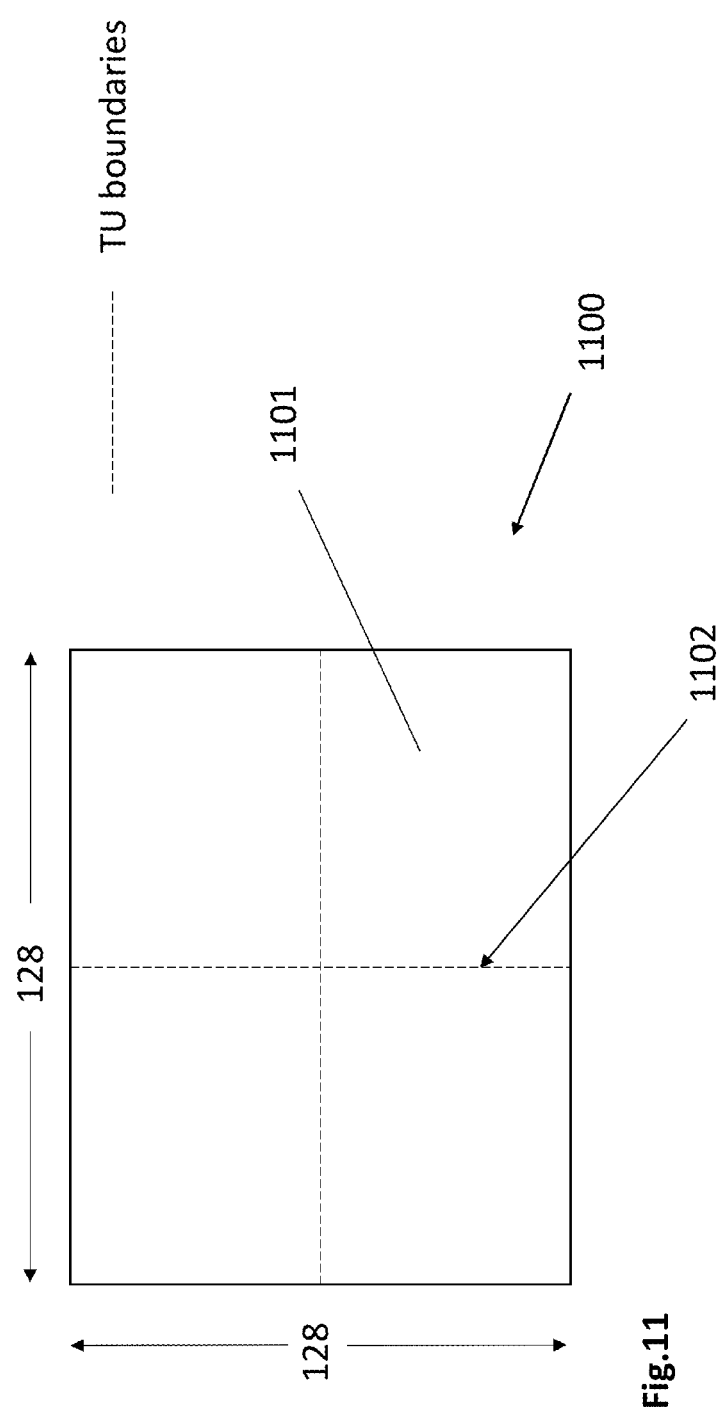
FIG. 11 illustrates sub-block edges caused by TU size limitations.

However, the sub-block edges might also be caused by TU size limitations. In VTM3.0, the largest TU size is 64×64 samples. If a CU 1100 is 128×128 samples, then it will be divided into 4 TUs 1101, resulting 4 TU boundaries 1102, shown as in FIG. 11. When the maximum TU size is 64, a CU with combined inter intra prediction is 128×128, the CU is divided into four Tus 1101, the transform is applied at 64×64 granularity. TU Boundaries 1102 highlighted as dashed lines needs to be deblocked.

Figure 12:
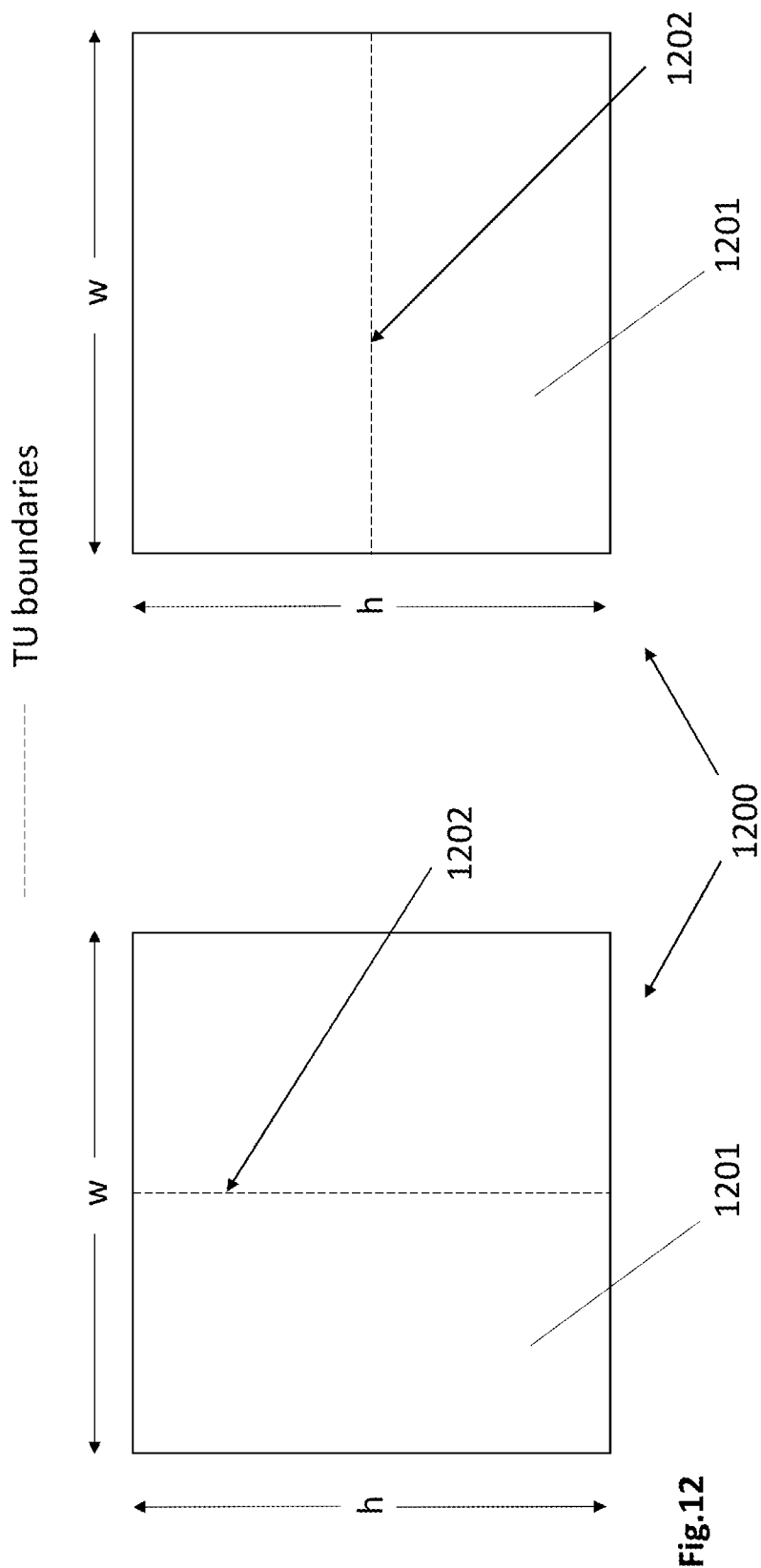
FIG. 12 shows a coding unit divided into multiple transform units.

FIG. 12 shows a coding unit 1200 applied with CIIP, and which is further divided into multiple transform units 1201. TU boundaries 1202 highlighted as dashed lines need to be deblocked.

Figure 13:
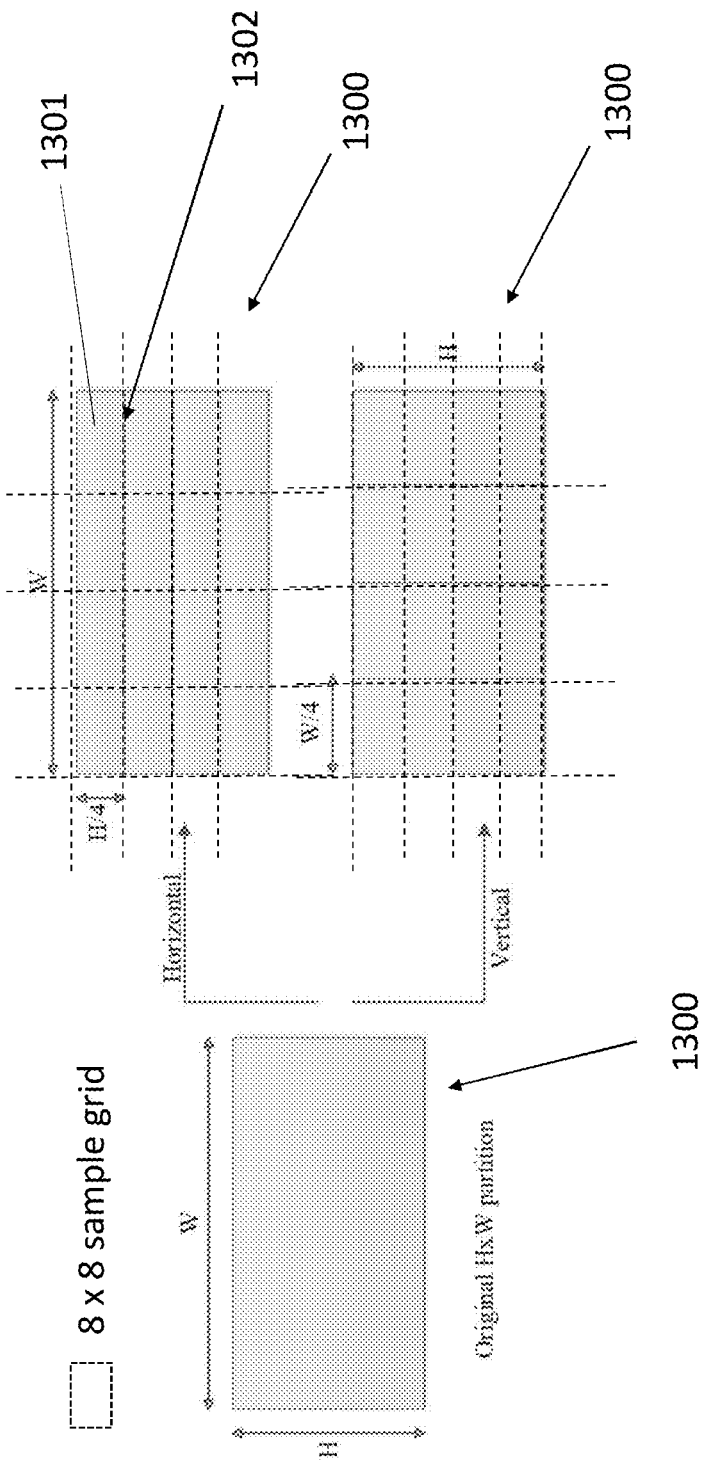
FIG. 13 illustrates deblocking all sub-block TU boundaries within a CU which overlaps with (aligned with) an 8×8 sample grid.

FIG. 13 illustrates deblocking all sub-block TU boundaries 1302 between TUs 1301 within a CU 1300 which overlap with (are aligned with) an 8×8 sample grid starting from the top-left sample of the CU 1300.

TU Boundaries Inside a Coding Unit

Figure 14:
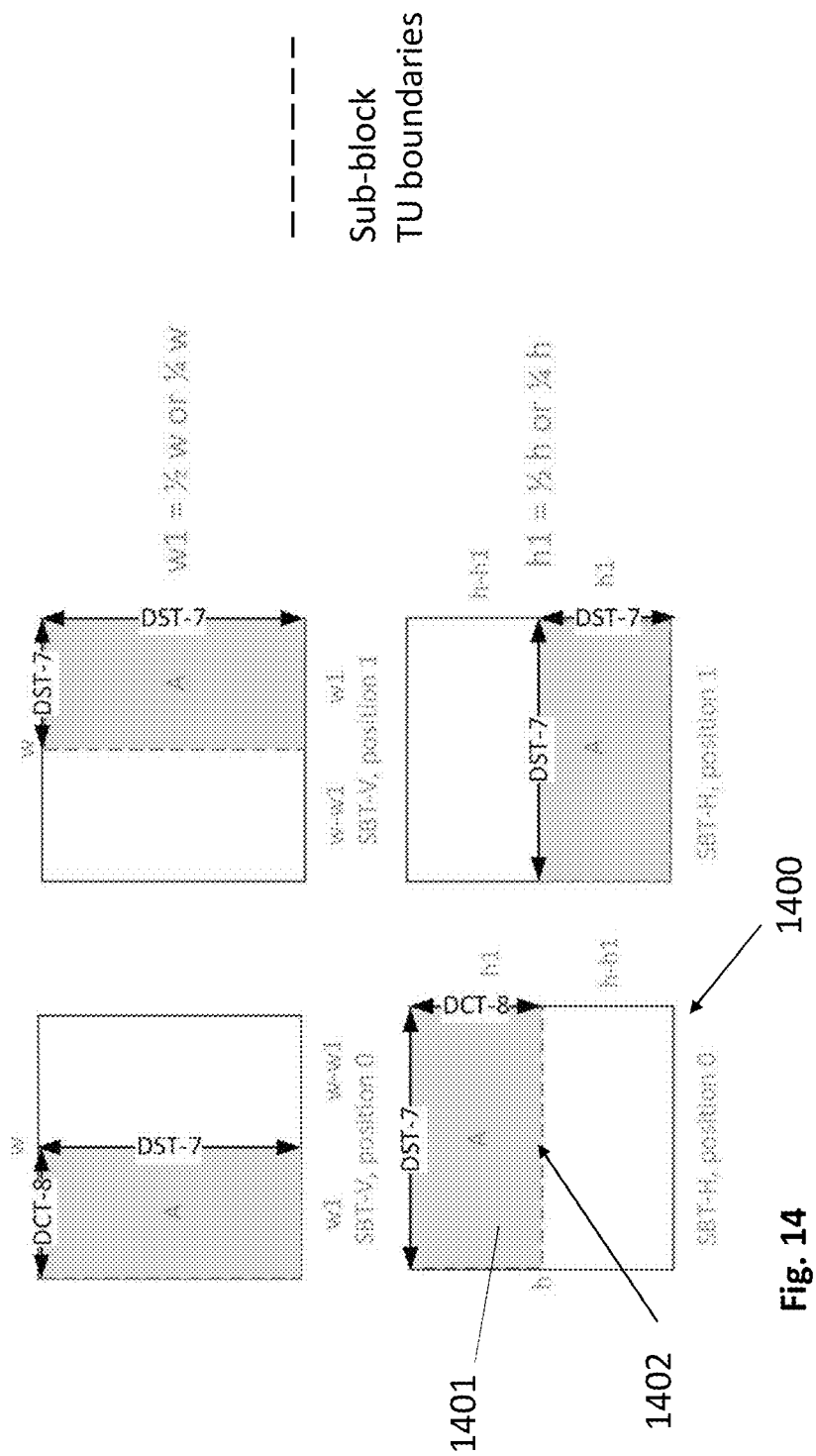
FIG. 14 shows a coding unit that is further divided into multiple transform units.

When certain coding tool (e.g. sub-block transform, SBT) is applied, TU edges 1402 between TUs 1401 can occur inside a CU 1400, such as shown in FIG. 14. A coding unit 1400 is further divided into multiple transform units 1401 according to sub-block transform coding tool. In such cases, these internal TU edges 1402 inside a coding unit 1400 might also need to be deblocked.

When SBT is used for an inter-coded CU 1400, SBT type and SBT position information are signaled in the bitstream. There are two SBT types and two SBT positions, as indicated in FIG. 14. For SBT-V (or SBT-H), the TU width (or height) may equal to half of the CU width (or height) or ¼ of the CU width (or height), resulting in 2:2 split or 1:3/3:1 split. The 2:2 split is like a binary tree (BT) split while the 1:3/3:1 split is like an asymmetric binary tree (ABT) split. In ABT splitting, only the small region contains the non-zero residual. If one dimension of a CU is 8 in luma samples, the 1:3/3:1 split along that dimension is disallowed. There are at most 8 SBT modes for a CU.

Position-dependent transform core selection is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 14. For example, the horizontal and vertical transforms for SBT-V position 0 is DCT-8 and DST-7, respectively. When one side of the residual TU 1401 is greater than 32, the transform for both dimensions is set as DCT-2. Therefore, the subblock transform jointly specifies the TU tiling, cbf, and horizontal and vertical core transform type of a residual block.

A variable maxSbtSize is signaled in SPS to specify the max CU size for which SBT can be applied. In the VTM7 reference software, for HD and 4K sequences, maxSbtSize is set as 64 by encoder; for other smaller resolution sequences, maxSbtSize is set as 32. The SBT is not applied to the CU coded with combined inter-intra mode or TPM mode.

Figure 15:
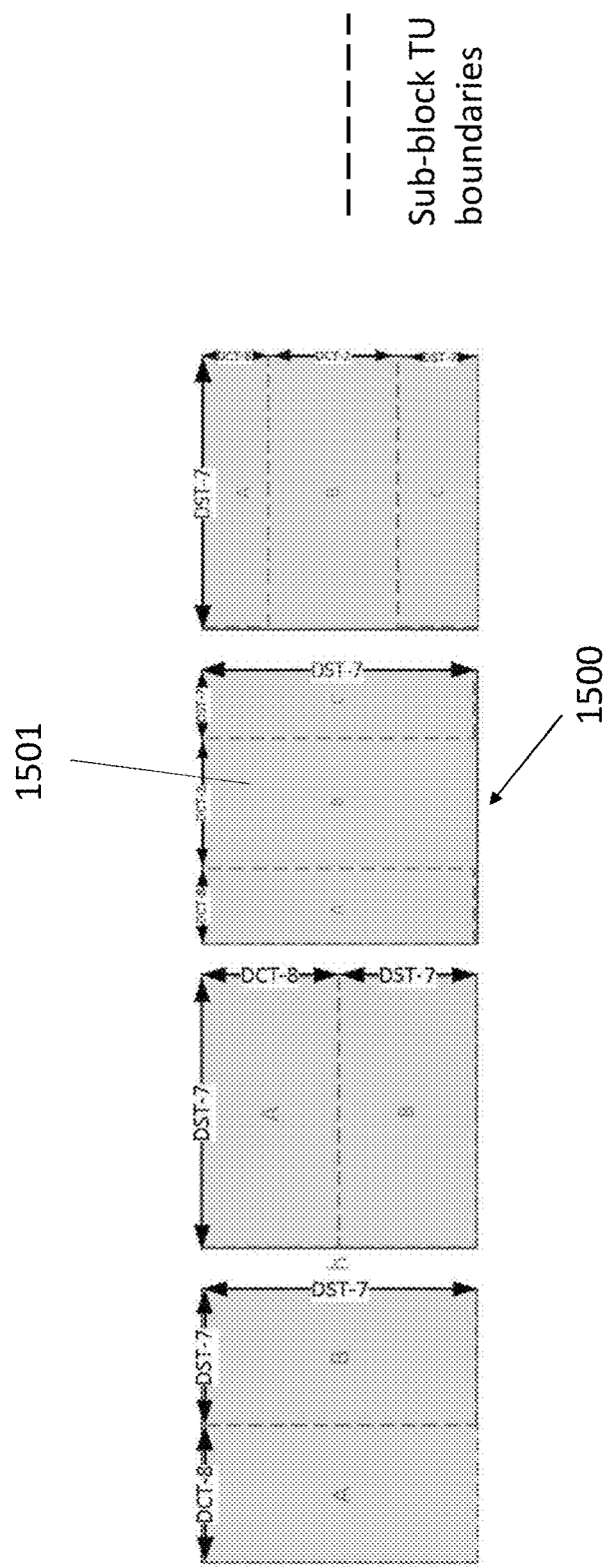
FIG. 15 shows a coding unit that is further divided into multiple transform units according to residual quad tree (RQT) like sub-block transform.

Similarly, FIG. 15 shows a coding unit 1500 that is further divided into multiple transform units 1501 (A, B, C) according to residual quad tree (RQT) like sub-block transform.

In the rest of the application the following terminology is used:

CIIP blocks: The coding blocks that are predicted by application of CIIP prediction.

Intra blocks: The coding blocks that are predicted by application of intra prediction but not CIIP prediction.

Inter blocks: The coding blocks that are predicted by application of inter prediction but not CIIP prediction.

Deblocking Filter and Boundary Strength

The disclosure, in particular as described above in the first and second aspects, includes performing a deblocking filtering process to transform block boundary between a first transform block and a second transform block at least based on the value of the boundary strength parameter. The boundary strength parameter is further described and defined in the following (see Table 1).

Video coding schemes such as HEVC and VVC are designed along the successful principle of block-based hybrid video coding. Using this principle a picture is first partitioned into blocks and then each block is predicted by using intra-picture or inter-picture prediction. These blocks are coded relatively from the neighboring blocks and approximate the original signal with some degree of similarity. Since coded blocks only approximate the original signal, the difference between the approximations may cause discontinuities at the prediction and transform block boundaries. These discontinuities are attenuated by the deblocking filter.

A decision whether to filter a block boundary uses the bitstream information such as prediction modes and motion vectors. Some coding conditions are more likely to create strong block artifacts, which are represented by a so-called boundary strength (Bs or BS) variable that is assigned to every block boundary and is determined as in Table 1.

TABLE 1

| Conditions | Bs |
|---|---|
| At least one of the adjacent blocks is intra | 2 |
| At least one of the adjacent blocks has non-zero transform coefficients | 1 |

TABLE 1-continued

| Conditions | Bs |
| --- | --- |
| Absolute difference between the motion vectors that belong to the adjacent blocks is greater than or equal to one integer luma sample | 1 |
| Motion prediction in the adjacent blocks refers to different reference pictures or number of motion vectors is different | 1 |
| Otherwise | 0 |

The deblocking is only applied to the block boundaries with Bs greater than zero for a luma component and Bs greater than 1 for chroma components. Higher values of Bs enable stronger filtering by using higher clipping parameter values. The Bs derivation conditions reflect the probability that the strongest block artifacts appear at the intra-predicted block boundaries.

Figure 16:
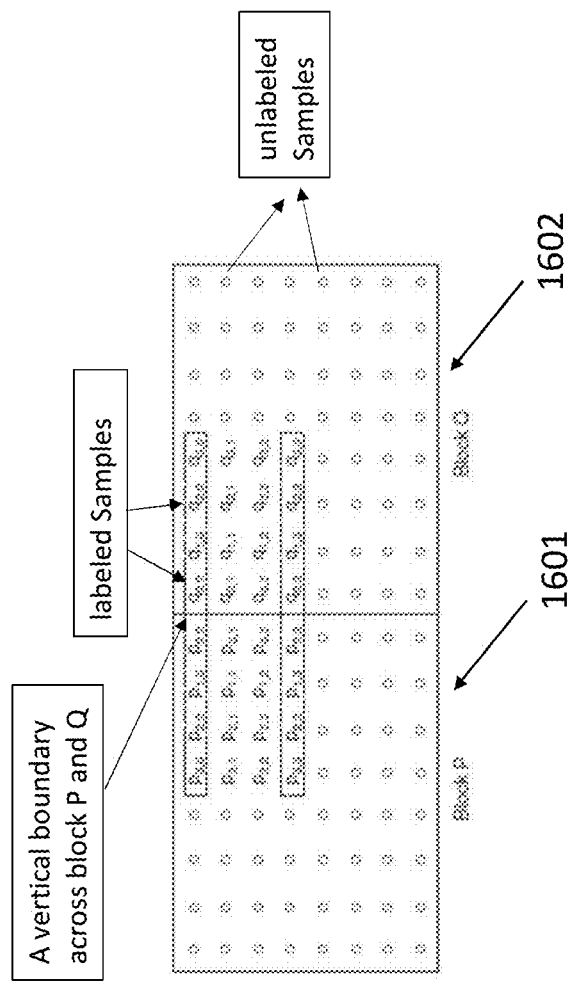
FIG. 16 shows a vertical boundary across two blocks P and Q.

Usually, the two adjacent blocks 1601, 1602 of a boundary are labeled as P and Q, as shown in FIG. 16. The figure depicts the case of a vertical boundary. If a horizontal boundary is considered, then FIG. 16 shall be rotated 90 degree clock wise, where P would be in upside and Q the downside.

Figure 17:
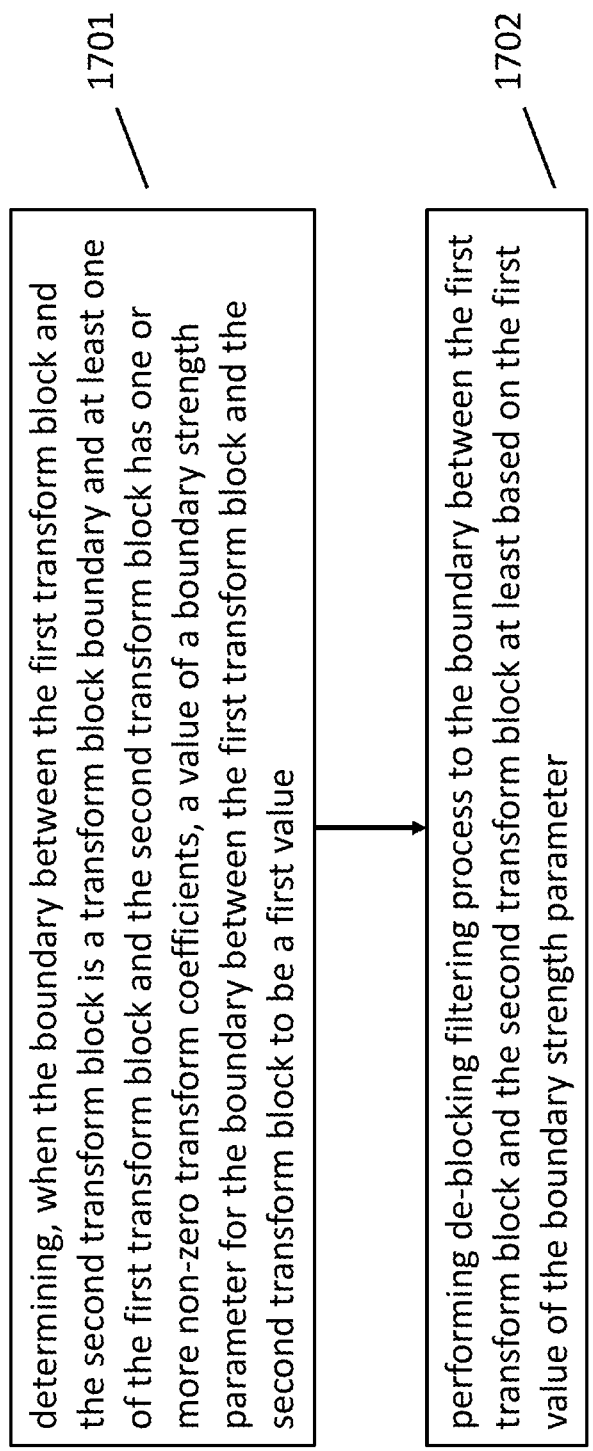
FIG. 17 shows a flow diagram for the method according to the first aspect of the disclosure.

The method according to the first aspect of the disclosure is illustrated in the flow diagram FIG. 17. The method is a deblocking method, for deblocking a transform block boundary within a coding block in an image encoding and/or an image decoding, wherein the coding block is coded in inter prediction mode and the coding block is divided into transform blocks comprising a first transform block and a second transform block which is adjacent to the first transform block; wherein the method comprises a step 1701 of determining, when the boundary between the first transform block and the second transform block is a transform block boundary and at least one of the first transform block and the second transform block has one or more non-zero transform coefficients, a value of a boundary strength (BS) parameter for the boundary between the first transform block and the second transform block to be a first value; and further steps 1702 of performing de-blocking filtering process to the boundary between the first transform block and the second transform block at least based on the value of the boundary strength parameter.

Figure 18:
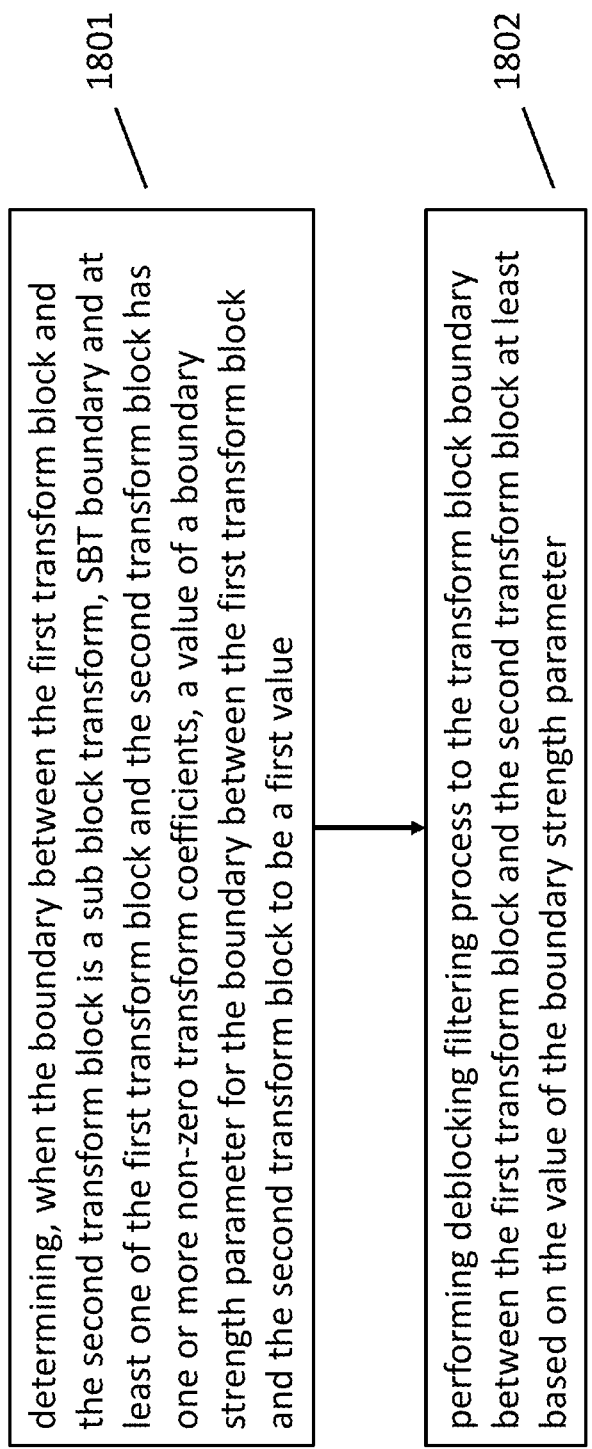
FIG. 18 shows a flow diagram for the method according to the second aspect of the disclosure.

The method according to the second aspect of the disclosure is illustrated in the flow diagram of FIG. 18. The method is a deblocking method, for deblocking block boundaries within a coding block in an image encoding and/or an image decoding, wherein the coding block is coded in inter prediction mode and the coding block is divided into transform blocks comprising a first transform block and a second transform block which is adjacent to the first transform block; wherein the method comprises a step 1801 of: in response to a determination that a transform block boundary between the first transform block and the second transform block is to be filtered, determining, when the boundary between the first transform block and the second transform block is a sub block transform, SBT boundary and at least one of the first transform block and the second transform block has one or more non-zero transform coefficients, a value of a boundary strength parameter for the boundary between the first transform block and the second transform block to be a first value; and a step 1802 of: performing deblocking filtering process to the transform block boundary between the first transform block and the second transform block at least based on the value of the boundary strength parameter.

Figure 19:
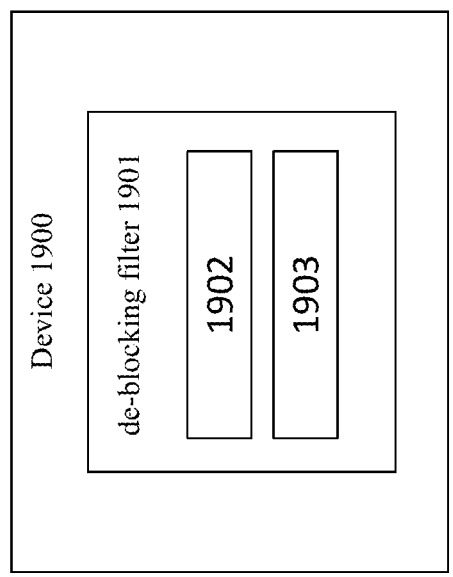
FIG. 19 shows a schematic diagram of a device for video coding.

FIG. 19 illustrates a device according to the third aspect. The device 1900 comprises a de-blocking filter 1901 configured for deblocking a transform block boundary within a coding block, wherein the coding block is coded (predicted) in inter prediction mode and the coding block comprises transform blocks (such as, the coding block is divided (split) into transform blocks during the inter prediction process, for example, when sub block transform is enabled, the current coding unit is divided into two transform units) comprising a first transform block and a second transform block which is adjacent to the first transform block. The de-blocking filter 1901 comprises a determining module 1902 configured to determine, when the boundary between the first transform block and the second transform block is a transform block boundary and at least one of the first transform block and the second transform block has one or more non-zero transform coefficients, a value of a boundary strength parameter for the boundary between the first transform block and the second transform block to be a first value; and a de-blocking filtering module 1903 configured to perform de-blocking filtering process to the boundary between the first transform block and the second transform block at least based on the first value of the boundary strength parameter.

In an example, the de-blocking filter 1901 may be corresponding to the loop filter 220 in FIG. 2. In another example, the de-blocking filter 1901 may be corresponding to the loop filter 320 in FIG. 3. Correspondingly, in an example, an example structure of the device 1900 may be corresponding to encoder 200 in FIG. 2. In another example, an example structure of the device 1900 may be corresponding to the decoder 300 in FIG. 3.

Figure 20:
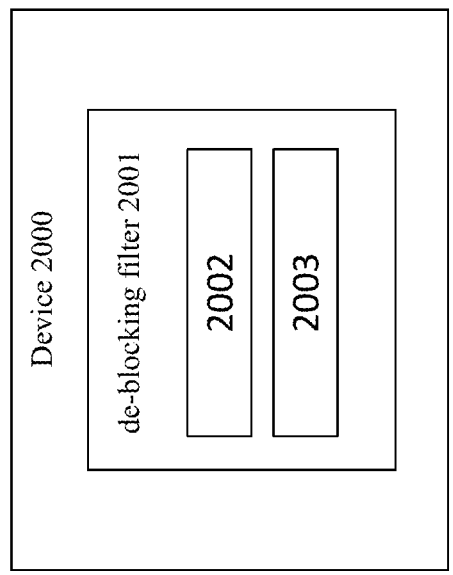
FIG. 20 shows a schematic diagram of a device for video coding.

FIG. 20 illustrates a device according to the fourth aspect. The device 2000 comprises a de-blocking filter 2001 configured for deblocking block boundaries within a coding block (coding unit), wherein the coding block is coded (predicted) in inter prediction mode (in particular, the coding block is coded in a sub block transform, SBT mode) and the coding block (an inter-predicted coding block is divided (split) into transform blocks in the inter prediction process, for example, when sub block transform is enabled, the current coding unit is divided into two or more transform units) comprising a first transform block and a second transform block which is adjacent to the first transform block (for example, Transform blocks contain p0 and q0 are adjacent in vertical or horizontal direction). The de-blocking filter 2001 comprises a determining module 2002 configured to determine, when the boundary between the first transform block and the second transform block is a sub block transform, SBT, boundary and at least one of the first transform block and the second transform block has one or more non-zero transform coefficients, a value of a boundary strength parameter for the boundary between the first transform block and the second transform block to be a first value (such as, in response to a determination that a transform block boundary between the first transform block and the second transform block is to be filtered; and a de-blocking module 2003 configured to perform a de-blocking filtering process to the transform block boundary between the first transform block and the second transform block at least based on the value of the boundary strength parameter.

In an example, the de-blocking filter 2001 may be corresponding to the loop filter 220 in FIG. 2. In another example, the de-blocking filter 2001 may be corresponding to the loop filter 320 in FIG. 3. Correspondingly, in an example, an example structure of the device 2000 may be corresponding to encoder 200 in FIG. 2. In another example, an example structure of the device 2000 may be corresponding to the decoder 300 in FIG. 3.

A reference document Versatile Video Coding (Draft 3) is defined as VVC Draft 3.0, and can be found via the following link:
http://phenix.it-sudparis.eu/jvet/doc_end_user/documents/12_Macao/wg11/JVET-L1001-v13.zip.

In an example, according to the 8.6.2.5 of VVC Draft 3.0 v9, 8.6.2.5 Derivation process of boundary filtering strength
Inputs to this process are:
a picture sample array recPicture,
a location (xCb, yCb) specifying the top-left sample of the current coding block relative to the top-left sample of the current picture,
a variable nCbW specifying the width of the current coding block,
a variable nCbH specifying the height of the current coding block,
a variable edgeType specifying whether a vertical (EDGE_VER) or a horizontal (EDGE_HOR) edge is filtered,
a two-dimensional (nCbW)×(nCbH) array edgeFlags.
Output of this process is a two-dimensional (nCbW)×(nCbH) array bS specifying the boundary filtering strength.
The variables $xD_i$, $yD_j$, xN and yN are derived as follows:
If edgeType is equal to EDGE_VER, $xD_i$ is set equal to (i<<3), $yD_j$ is set equal to (j<<2), xN is set equal to Max(0, (nCbW/8)−1) and yN is set equal to (nCbH/4)−1.
Otherwise (edgeType is equal to EDGE_HOR), $xD_i$ is set equal to (i<<2), $yD_j$ is set equal to (j<<3), xN is set equal to (nCbW/4)−1 and yN is set equal to Max(0, (nCbH/8)−1).
For $xD_i$ with i=0 . . . xN and $yD_j$ with j=0 . . . yN, the following applies:
If edgeFlags[$xD_i$][$yD_j$] is equal to 0, the variable bS[$xD_i$][$yD_j$] is set equal to 0.
Otherwise, the following applies:
The sample values $p_0$ and $q_0$ are derived as follows:
If edgeType is equal to EDGE_VER, $p_0$ is set equal to recPicture [xCb+$xD_i$−1] [yCb+$yD_j$] and $q_0$ is set equal to recPicture [xCb+$xD_i$][yCb+$yD_j$].
Otherwise (edgeType is equal to EDGE_HOR), $p_0$ is set equal to recPicture [xCb+$xD_i$][yCb+$yD_j$−1] and $q_0$ is set equal to recPicture [xCb+$xD_i$][yCb+$yD_j$].
The variable bS[$xD_i$][$yD_j$] is derived as follows:
If the sample $p_0$ or $q_0$ is in the coding block of a coding unit coded with intra prediction mode, bS[$xD_i$][$yD_j$] is set equal to 2.
Otherwise, if the block edge is also a transform block edge and the sample $p_0$ or $q_0$ is in a transform block which contains one or more non-zero transform coefficient levels, bS[$xD_i$][$yD_j$] is set equal to 1.
Otherwise, if one or more of the following conditions are true, bS[$xD_i$][$yD_j$] is set equal to 1:
For the prediction of the coding subblock containing the sample $p_0$ different reference pictures or a different number of motion vectors are used than for the prediction of the coding subblock containing the sample $q_0$.
NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.
NOTE 2—The number of motion vectors that are used for the prediction of a coding subblock with top-left sample covering (xSb, ySb), is equal to PredFlagL0[xSb] [ySb]+PredFlagL1 [xSb][ySb].
One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 4 in units of quarter luma samples.
Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples.
Two motion vectors for the same reference picture are used to predict the coding subblock containing the sample $p_0$, two motion vectors for the same reference picture are used to predict the coding subblock containing the sample $q_0$ and both of the following conditions are true:
The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.
The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples.
Otherwise, the variable bS [$xD_i$][$yD_j$] is set equal to 0.

Furthermore, the VVC documentation refers to "coding tree semantics" and "Subblock Transform (SBT)" as follows:

7.4.9.4 Coding Tree Semantics
. . .
. . .
cu_sbt_flag equal to 1 specifies that for the current coding unit, subblock transform is used.
cu_sbt_flag equal to 0 specifies that for the current coding unit, subblock transform is not used.
When cu_sbt_flag is not present, its value is inferred to be equal to 0.
NOTE—: When subblock transform is used, a coding unit is split into two transform units; one transform unit has residual data, the other does not have residual data.
cu_sbt_horizontal_flag equal to 1 specifies that the current coding unit is split horizontally into 2 transform units. cu_sbt_horizontal_flag[x0][y0] equal to 0 specifies that the current coding unit is split vertically into 2 transform units.

According to an embodiment of the present application, if a CU is divided into multiple sub-blocks and transform is applied at sub-block granularity, then the sub-block TU boundary inside a CU shall be deblocked. This embodiment proposes to deblock sub-block TU boundary inside a CU in a proper way.

In this embodiment, for a boundary with two sides as shown in FIG. 16 (where the spatially adjacent blocks on each side are denoted as block P and block Q), the boundary strength is derived as follows:
if both blocks P and Q are in a same CU and the boundary between block P and block Q is a sub-block TU boundary, as shown in FIG. 14 or FIG. 15, then the boundary strength parameter of the said boundary is set according to the following condition:
if at least one of the adjacent blocks P and Q has at least one non-zero transform coefficients, then the boundary strength parameter of the said boundary is set equal to a non-zero value, e.g. 1.
Otherwise, if both block P and Q have no non-zero transform coefficients, then the boundary strength parameter of this boundary is set equal to 0.
Otherwise, the boundary strength is derived as the above example, i.e. the boundary strength derivation process as defined in section 8.6.2.5 of VVC Draft 3.0 v9.
The pixel samples comprised in block Q and block P are filtered with application of a deblocking filter according to the determined boundary strength.

In one example, when the sub-block TU boundaries are aligned with an N×M grid, these sub-block TU boundaries are deblocked, as defined in above embodiment. In one example, N is 8, M is 8. In another example, N is 4 and M is 4. Otherwise (if these sub-block TU boundaries are not aligned with an N×M grid), they are not deblocked.

In one example, for a CU whose top-left position is not aligned with an 8×8 grid (as shown in FIG. 13), sub-block TU boundaries which are aligned with the said 8×8 grid are deblocked, as defined in above embodiment. Otherwise (these sub-block TU boundaries are not aligned with the 8×8 grid), they are not deblocked.

In one example, for a CU whose top-left position is aligned with an 8×8 grid (as shown in FIG. 13), sub-block TU boundaries which are aligned with the said 8×8 grid are deblocked, as defined in above embodiment. Otherwise (these sub-block TU boundaries are not aligned with the 8×8 grid), they are not deblocked.

In one example, regardless the position of sub-block TU boundaries, all sub-block TU boundaries inside a CU are deblocked, as defined in above embodiment.

The disclosure provides the following further embodiments:

A coding method, wherein the coding includes decoding or encoding, and the method comprises: dividing a coding unit or a coding block into at least two sub-blocks comprising a first sub-block and a second sub-block; and when a boundary between the first sub-block and the second sub-block is aligned to a sub-block transform unit boundary, setting a value of a boundary strength parameter corresponding to the boundary between the first sub-block and the second sub-block, according to one or more transform coefficients of the first sub-block or one or more transform coefficients of the second sub-block; wherein the first sub-block and the second sub-block are transform blocks.

The coding unit or coding block may be divided in a horizontal or in a vertical direction.

When a value of one or more transform coefficient of the first sub-block is not equal to zero, or when a value of one or more transform coefficient of the second sub-block is not equal to zero, the value of the boundary strength parameter may be set to a first value. The first value may be not equal to zero, in particular, the first value may be 1 or 2.

When all values of transform coefficients of the first sub-block are equal to zero, and all values of transform coefficients of the second sub-block are equal to zero, the value of the boundary strength parameter may be set to a second value. The second value may be zero.

An encoder (20) may comprise processing circuitry for carrying out the method described above. A decoder (30) may comprise processing circuitry for carrying out the method described above.

A computer program may comprise a program code for performing the method described above.

According to an aspect, a decoder may comprise: one or more processors; and a non-transitory computer-readable storage medium coupled to the processors and storing programming for execution by the processors, wherein the programming, when executed by the processors, configures the decoder to carry out the method described above.

According to an aspect, an encoder may comprise: one or more processors; and a non-transitory computer-readable storage medium coupled to the processors and storing programming for execution by the processors, wherein the programming, when executed by the processors, configures the encoder to carry out the method described above.

Following is an explanation of the applications of the encoding method as well as the decoding method as shown in the above-mentioned embodiments, and a system using them.

Figure 21:
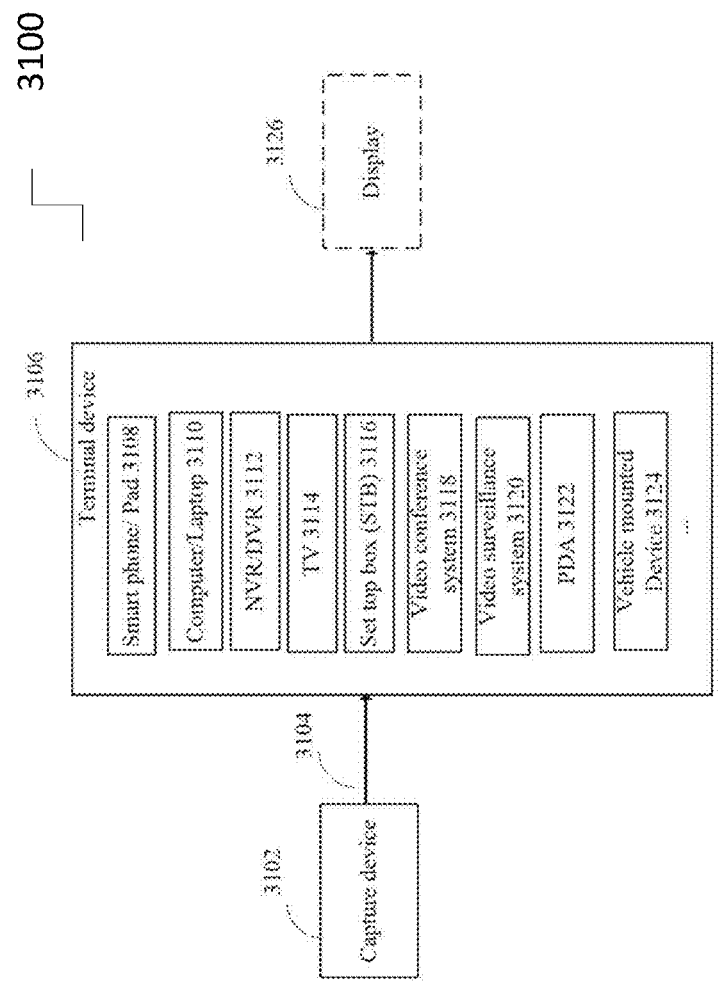
FIG. 21 is a block diagram showing an example structure of a content supply system which realizes a content delivery service.

FIG. 21 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 22:
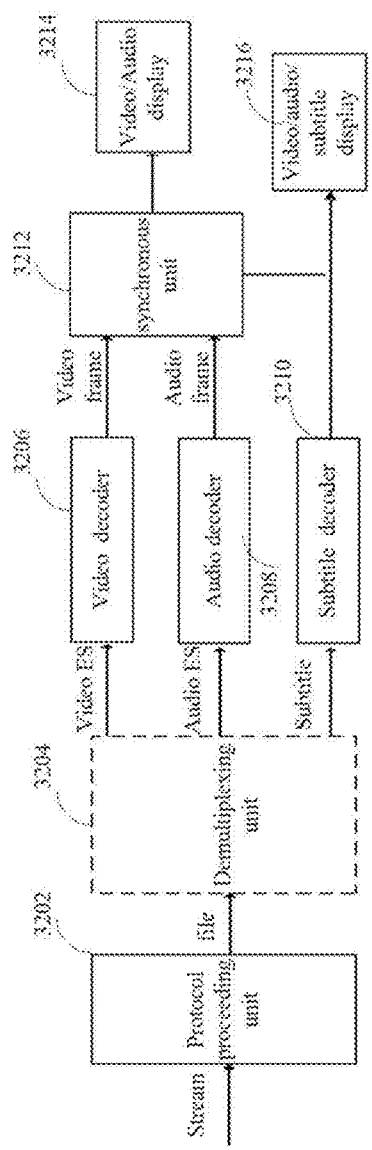
FIG. 22 is a block diagram showing a structure of an example of a terminal device.

FIG. 22 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 22) before feeding it to the synchronous unit 3212. Similarly, the audio frame may store in a buffer (not shown in FIG. 22) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

The disclosure has been described in conjunction with various embodiments herein. However, other variations to the disclosed embodiments can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A de-blocking filter device in an image encoder or an image decoder, for deblocking transform block boundaries of transform blocks within a coding block coded in inter prediction mode, the transform blocks including a first transform block and a second transform block that is adjacent to the first transform block, comprising: a memory storing instructions; and a processor in communication with the memory and upon execution of the instructions, is configured to: determine, when a boundary between the first transform block and the second transform b lock is a transform block boundary and at least one of the first transform block or the second transform block has one or more non-zero transform coefficients, a value of boundary strength (BS) parameter for the boundary between the first transform block and the second transform block to be a first value, wherein the transform block boundary between the first transform block and the second transform block is to be de-blocked only when a transform block boundary between luma samples of the first and second transform block is aligned with a 4×4 sample gird; and perform a de-blocking filtering process to the boundary between the first transform block and the second transform block based on the first value of the BS parameter.

2. The de-blocking filter device according to claim 1, wherein the boundary between the first transform block and the second transform block is a sub-block transform (SBT) boundary.

3. The de-blocking filter device according to claim 1, wherein the transform blocks further include a third transform block that is adjacent to the second transform block, and wherein the processor is further configured to:
  determine, when a boundary between the second transform block and the third transform block is a sub block transform (SBT) boundary and at least one of the second transform block or the third transform block has one or more non-zero transform coefficients, a value of a boundary strength parameter for the boundary between the second transform block and the third transform block to be the first value; or
  determine, when the boundary between the second transform block and the third transform block is a sub block transform, SBT boundary and both the second transform block and the third transform block have zero transform coefficients, a value of a boundary strength parameter for the boundary between the second transform block and the third transform block to be a second value.

4. The de-blocking filter device according to claim 3, wherein the processor is further configured to:
  in response to a determination that the boundary between the second transform block and the third transform block is aligned with an n×n sample grid, determine, when the boundary between the second transform block and the third transform block is a SBT boundary and at least one of the second transform block or the third transform block has one or more non-zero transform coefficients, a value of a boundary strength parameter for the boundary between the second transform block and the third transform block to be the first value; or
  in response to a determination that the boundary between the second transform block and the third transform block is aligned with an n×n sample grid, determine, when the boundary between the second transform block and the third transform block is a sub block transform, SBT boundary and both the second transform block and the third transform block have zero transform coefficients, a value of a boundary strength parameter for the boundary between the second transform block and the third transform block to be the second value.

5. The de-blocking filter device according to claim 3, wherein the second value is zero.

6. The de-blocking filter device according to claim 1, wherein the first value is 1.

7. The de-blocking filter device according to claim 1, wherein, when the coding block is divided in a horizontal direction, the transform block boundary between the first transform block and the second transform block is a horizontal transform block boundary, or when the coding block is divided in a vertical direction, the transform block boundary between the first transform block and the second transform block is a vertical transform block boundary.

8. The de-blocking filter device according to claim 1, wherein the coding block is coded using a sub block transform (SBT) tool or the transform block boundary between the first transform block and the second transform block is caused by the SBT tool.

9. The de-blocking filter device according to claim 1, wherein the processor is further configured to: in response to a determination that the transform block boundary between luma samples of the first and second transform blocks is aligned with the 4×4 sample grid, determine, when the boundary between the first transform block and the second transform block is a sub block transform (SBT) boundary and at least one of the first transform block or the second transform block has one or more non-zero transform coefficients, a value of a boundary strength parameter for the boundary between the first transform block and the second transform block to be the first value.

10. A de-blocking method for deblocking transform block boundaries of transform blocks within a coding block in an image encoding or an image decoding, the coding block coded in inter prediction mode and the transform blocks including a first transform block and a second transform block that 1s adjacent to the first transform block, comprising:
  determining, when a boundary between the first transform block and the second transform block is a transform block boundary and at least one of the first transform block or the second transform block has one or more non-zero transform coefficients, a value of a boundary strength (BS) parameter for the boundary between the first transform block and the second transform block to be a first value, wherein the transform block boundary between the first transform block and the second transform block is to be de-blocked only when the transform block boundary between luma samples of the first and second transform blocks is aligned with a 4×4 sample grid; and performing de-blocking filtering process to the boundary between the first transform block and the second transform block based on the first value of the BS parameter.

11. The method according to claim 10, wherein the boundary between the first transform block and the second transform block is a sub-block transform (SBT) boundary.

12. The method according to claim 10, wherein the transform blocks further comprise a third transform block that is adjacent to the second transform block,
and wherein the method further comprises:
  determining, when a boundary between the second transform block and the third transform block is a sub block transform (SBT) boundary and at least one of the second transform block or the third transform block has one or more non-zero transform coefficients, a value of a boundary strength parameter for the boundary between the second transform block and the third transform block to be the first value; or
  determining, when the boundary between the second transform block and the third transform block is the SBT boundary and both the second transform block and the third transform block have zero transform coefficients, a value of a boundary strength parameter for the boundary between the second transform block and the third transform block to be a second value.

13. The method according to claim 12, wherein the second value is zero.

14. The method according to claim 10, wherein the first value is 1.

15. The method according to claim 10, wherein, when the coding block is divided in a horizontal direction, the transform block boundary between the first transform block and the second transform block is a horizontal transform block boundary, or when the coding block is divided in a vertical direction, the transform block boundary between the first transform block and the second transform block is a vertical transform block boundary.

16. The method according to claim 10, wherein the coding block is coded using a sub block transform (SBT) tool or the transform block boundary is caused by the SBT tool.

17. A non-transitory computer-readable medium storing computer instructions that, when executed by one or more processors, cause the one or more processors to perform operations of deblocking transform block boundaries of transform blocks within a coding block in an image encoding or image decoding, the coding block coded in inter prediction mode and the transform blocks including a first transform block and a second transform block that is adjacent to the first transform block, the operations comprising: determining, when a boundary between the first transform block and the second transform block is a transform block boundary and at least one of the first transform block or the second transform block has one or more non-zero transform coefficients, a value of a boundary strength (BS) parameter for the boundary between the first transform block and the second transform block to be a first value, wherein the transform block boundary between the first transform block and the second transform block is to be de-blocked only when the transform block boundary between luma samples of the first and second transform blocks is aligned with a 4×4 sample grid; and performing de-blocking filtering process to the boundary between the first transform block and the second transform block based on the first value of the BS parameter.

\* \* \* \* \*